United States Patent [19]

Sekiya et al.

[11] Patent Number: 5,121,873

[45] Date of Patent: Jun. 16, 1992

[54] METHOD OF AND APPARATUS FOR JOINING HOT MATERIALS TO BE ROLLED TO EACH OTHER AS WELL AS CONTINUOUS HOT ROLLING METHOD AND SYSTEM

[75] Inventors: Teruo Sekiya, Takahagi; Tomoaki Kimura, Hitachi; Yoshio Takakura, Hitachi; Tadashi Nishino, Hidachi; Toshiyuki Kajiwara, Hitachi, all of Japan

[73] Assignee: Hitachi Ltd., Japan

[21] Appl. No.: 709,327

[22] Filed: Jun. 3, 1991

[30] Foreign Application Priority Data

Jun. 6, 1990 [JP] Japan ................... 2-147618
Jun. 13, 1990 [JP] Japan ................... 2-152736

[51] Int. Cl.⁵ .................. B23K 7/00; B23K 20/00; B22D 11/00; B22D 11/12
[52] U.S. Cl. .................. 228/170; 228/176; 228/242; 228/5.7; 228/902; 164/476; 164/477; 29/527.6; 29/527.7
[58] Field of Search .............. 228/170, 171, 176, 233, 228/234, 242, 243, 3.1, 5.7, 902, 265; 164/476, 477, 417; 72/203; 29/527.5, 527.6, 527.7

[56] References Cited

U.S. PATENT DOCUMENTS

| 2,058,447 | 10/1936 | Hazelett | 164/477 |
| 4,706,871 | 11/1987 | Kajiwara et al. | 228/5.7 |

FOREIGN PATENT DOCUMENTS

| 3231187 | 2/1984 | Fed. Rep. of Germany | 164/477 |
| 59-130603 | 7/1984 | Japan . | |
| 60-170581 | 9/1985 | Japan . | |
| 60-250811 | 12/1985 | Japan | 228/5.7 |
| 61-253178 | 11/1986 | Japan . | |
| 62-127185 | 6/1987 | Japan . | |
| 62-234679 | 10/1987 | Japan . | |

Primary Examiner—Samuel M. Heinrich
Attorney, Agent, or Firm—Evenson, Wands, Edwards, Lenahan & McKeown

[57] ABSTRACT

In a continuous hot rolling system, at least one melt-cut torch is set in a predetermined positional relationship with respect to a trailing end of a preceding hot material and a leading end of an adjacent succeeding hot material. An injected flow of cutting gas from the melt-cut torch is blown against a portion of at least one of the trailing end of the preceding material and the leading end of the succeeding material to melt-cut the portion. The portion extends from an end surface of the one end over a predetermined length. The trailing end of the preceding material and the leading end of the succeeding material are forced against each other and are butt-joined to each other. By doing so, there are produced joining surfaces superior in surface accuracy and high in temperature, to allow joining to be high in accuracy and strength. This joining may be made with respect to slabs before rough rolling, or may be made with respect to bars after rough rolling. Further, a slab manufactured by a continuous casting machine are reduced in thickness at a plurality of desired locations to form a plurality of thickness-reduced portions. Cutting is made at the thickness-reduced portions. The cut thickness-reduced portions are joined to each other. Furthermore, the ends of the respective materials after having been cut are reduced in thickness with the ends abutted against each other to form thickness-reduced portions. The thickness-reduced portions are joined to each other.

70 Claims, 21 Drawing Sheets

MELT-CUTTING   MELT-CUTTING

METHOD OF AND APPARATUS FOR JOINING HOT MATERIALS TO BE ROLLED TO EACH OTHER AS WELL AS CONTINUOUS HOT ROLLING METHOD AND SYSTEM

BACKGROUND OF THE INVENTION

The present invention relates to continuous hot rolling methods and systems therefor and, more particularly, to a continuous hot rolling method and a system therefor for joining a plurality of hot materials to be rolled to each other to conduct hot rolling continuously, as well as a method of and apparatus for joining a plurality of hot materials to be rolled to each other in a continuous hot rolling system.

Normally, a hot rolling system comprises a continuous casting machine, a heating furnace, a plurality of rough rolling mills and a plurality of fine rolling mills. Hot steel webs manufactured by the continuous casting machine successively pass through a heating step at the heating furnace and a hot rolling step at the rough rolling mills and the fine rolling mills. Thus, the hot steel webs are brought respectively to products. The hot steel webs are processed as slabs at the heating step and, accordingly, are rolled intermittently one by one at the hot rolling step.

In the hot rolling, continuous rolling has been considered in place of the intermittent rolling. The continuous rolling is made possible if hot materials to be rolled (hereinafter referred simply to as "hot materials" or "material"), before rolling or during, can be joined to each other. If the continuous rolling is made possible, extremely large profits or advantages can be expected such as saving-energy, an improvement in yield, power-saving and the like, in addition to an improvement in productivity. For this reason, various methods of joining the hot materials to each other have been proposed until now. For example, a joining method, in which adjacent joining surfaces are welded to each other by high frequency induction heating, is disclosed in JP,A,60-170581 and JP,A,62-234679. A joining method, in which arc is generated by direct current to weld adjacent joining surfaces to each other, is disclosed in JP,A,61-253178. Further, JP,A,62-127185 discloses a method in which iron powder is mixed, if necessary, with oxygen gas to heat and dissolve adjacent joining surfaces and to blow out oxidized scale from the joining surfaces, and then the joining surfaces are joined under pressure to each other.

However, any of the above-described prior art is insufficient to secure that the adjacent hot materials are joined to each other, and continuous rolling has not yet been put into practical use. The reason for this is as follows. That is, as will be described later, reliable joining of the adjacent hot materials requires three conditions including ① heating the entire adjacent end surfaces or the entire adjacent joining surfaces of the respective materials, to sufficient temperature equal to or above about 1400° C., ② no existence of oxidized scale on the adjacent joining surfaces more than a limit amount for joining, and ③ evenness or flatness of the configuration of the adjacent joining surfaces as far as possible. However, the prior art does not satisfy these conditions.

Specifically, of the above-described prior art, JP,A,62-127185 contemplates the aforesaid point ② of removal of oxidized scale. In JP,A,62-127185, however, oxygen gas is merely abutted against the adjacent joining surfaces with reference to the condition ①, and it is impossible to heat the entire adjacent joining surfaces to temperatures sufficient to facilitate joining. Also in the joining method due to the high frequency induction heating and the joining method due to the arc, it is difficult to put to practical use since large equipment is required to sufficiently heat a central portion of each of the adjacent joining surfaces and the oxidized scale affects the joining.

Moreover, no consideration is made in any of the above-described prior art with reference to the point ③. Specifically, adjacent end surfaces of the respective hot materials to be joined to each other are generally sheared by a drum-type shear so that each of the sheared surfaces is not brought to a surface straight in a thickness-wise direction and in a widthwise direction, but is brought to an irregular or uneven configuration. For this reason, mere heating and joining of the end surfaces to each other as they are make it impossible for the entire adjacent end surfaces of the respective materials to be joined to each other, but local joining is often liable to occur. Such local joining will cause an accident such as cutting or severing of the materials since tension is loaded onto the materials during rolling.

Further, a large thrust force is required for avoiding the local joining, but in this case, difficulties will occur such that large swelling or bulge is produced at the joined portions, the hot materials are joined to each other under a bent condition, and the like. Thus, a problem will occur in rolling after joining.

Furthermore, as another prior art relating to the continuous hot rolling system, JP,A,59-130603 has proposed that, on an inlet side of rough rolling mills or fine rolling mills in a hot rolling line, a trailing end of a preceding hot material and a leading end of an adjacent succeeding hot material are reduced in thickness by a press and, subsequently, both the thickness-reduced ends are joined to each other, thereby continuing the hot materials to be rolled.

In the above-described prior art, however, no consideration is made to problems during the rolling step after the hot materials have been reduced in thickness by a press tool. Thus, there are the following problems.

Specifically, since the trailing end of the preceding material and the leading end of the succeeding material are free, forcing due to the press tool will cause irregularities to be formed on the trailing and leading end surfaces. Thus, if the trailing and leading end surfaces are joined to each other, it is impossible to sufficiently join the end surfaces to each other. That is, the aforesaid condition ③ is not satisfied. Furthermore, in JP,A, 59-130603, it has been proposed that the irregularities on the end surfaces after pressing are crop-cut by a shear, and the end surfaces are reshaped. As described previously, however, a surface sheared by the drum-type shear is not brought to one straight in the thickness-wise direction and in the widthwise direction. Moreover, since the exclusive shear is required to be arranged, the system is complicated in structure. Further, since the joining is conducted by normal butt welding, considerable time will be required for press operation or working with respect to the ends of the materials and the joining operation with respect to the ends of the adjacent materials. This reduces the productivity and largely reduces the temperature of the entire hot materials. Furthermore, there is also the problem that since the joining time is long, a looper having large capacity will be required to practice continuous running or operation.

It is therefore a first object of the invention to provide a method of and an apparatus for joining hot materials to be rolled to each other as well as a continuous hot rolling system, in which conditions including heating of joining surfaces to adequate temperature, removal of oxidized scale, and an improvement in flatness of the joining surfaces are all satisfied to secure joining of the materials to each other thereby enabling continuous rolling.

It is a second object of the invention to provide a method of joining hot materials to be rolled to each other as well as a continuous hot rolling method and a system therefor, in which a trailing end of a preceding hot material and a leading end of an adjacent succeeding material are reduced in thickness by a press without occurrence of deformation on trailing and leading end surfaces due to the press, to secure that the trailing and leading ends of the respective hot materials are joined to each other for a short period of time.

SUMMARY OF THE INVENTION

In order to achieve the aforesaid first object, according to a first aspect of the invention, there is provided a method of joining a plurality of hot materials to be rolled to each other, in which a trailing end of a preceding one of the hot materials and a leading end of an adjacent succeeding one of the hot materials are joined to each other on a line of a continuous hot rolling system, wherein the method comprises: a first step of preparing at least one melt-cut torch for forming an injected flow of cutting gas; a second step of setting the melt-cut torch in a predetermined positional relationship with respect to the trailing end of the preceding hot material and the leading end of the succeeding hot material; a third step blowing the injected flow of the cutting gas against a portion of at least one of the trailing end of the preceding hot material and the leading end of the succeeding hot material to melt-cut said portion, the portion extending from an end surface of the one end over a predetermined width in a longitudinal direction of said hot material; and a fourth step of forcing the trailing end of the preceding hot material and the leading end of the succeeding hot material, at least one of which has the melt-cut portion, against each other to butt-join the trailing and leading ends to each other.

In connection with the above, "melt-cutting" in this specification means that a mother material on a surface of a hot material to be rolled is brought to a high-temperature molten condition by an injected flow of cutting gas, and the oxidized scale on the joining surface is blown out or blasted by gas pressure of the injected gas flow, to expose a new mother material under a high-temperature molten condition.

The joining method comprising the steps (a)~(d) according to the invention results from the following consideration by the inventors of the present application.

Specifically, according to consideration by the inventors of the present application, the following at least three conditions are required for ensuring joining of hot materials to each other:

① The end surface of each of the adjacent materials, that is, the joining surface is entirely heated to temperature equal to or above about 1400° C. at which the joining surface is brought to a sufficient molten condition;

② Oxidized scale does not exist on the joining surface; and

③ Configuration of the joining surface is planar or flat as far as possible.

In the present invention, an end surface of at least one of a trailing end of a preceding hot material and a leading end of an adjacent succeeding hot material is melt-cut, whereby there is produced joining surfaces equal to or above about 1400° C. under a molten condition. By this melt-cutting, even if each of the end surfaces of the adjacent respective materials is irregular in configuration due to shearing by a drum-type shear, the irregular configuration is reshaped or reformed so that there can be produced an end surface configuration high in evenness or flatness. Further, by the reshaping, oxidized scale on the end surface of the hot material is also removed so that there is produced a clean joining surface. Thus, it is made possible to join the end surface of the adjacent respective hot materials to each other with a small thrust force homogeneously and highly accurately. Accordingly, there is produced a joint which is high in strength.

Preferably, in the above-described joining method, the first step includes a step of arranging a plurality of melt-cut torches for forming their respective injected gas flows of the cutting gas in at least one row extending in a widthwise direction of the hot materials; the second step includes a step of making the setting such that each of the injected flows of the cutting gas is at least partially blown against at least one of the trailing end of the preceding hot material and the leading end of the succeeding hot material to form a corresponding cut-out in the one end; and the third step includes a step of conducting the melt-cutting by said plurality of melt-cut torches.

As described above, the plurality of melt-cut torches are arranged in the widthwise direction of the hot materials, and melt-cutting is made by the plurality of melt-cut torches, whereby time from initiation of the melt-cutting to completion thereof is shortened, making it possible that the joining surfaces are joined under pressure to each other before the oxidized scale is regenerated on the melt-cut surfaces. Thus, joining is made further reliable. In this respect, the third step may include a step of conducting the melt-cutting while the trailing end of the preceding material and the leading end of the succeeding material are forced against each other to conduct the third step and the fourth step simultaneously. With the arrangement, time from initiation of melt-cutting to completion of joining is further shortened, so that more reliable joining is made possible.

Preferably, the third step includes a step of moving at least part of the plurality of melt-cut torches laterally in the widthwise direction of the hot materials to conduct the melt-cutting. By doing so, melt-cutting time is further shortened. Further, in this case, upon setting of the ends of the respective adjacent hot materials, a plurality of cut-outs due to melt-cutting are formed in the ends of the respective materials, and the injected flows of the cutting gas pass respectively through the cut-outs over the thickness of each of the hot materials. Accordingly, since melt-cutting is conducted with the cut-outs serving respectively as start points, melt-cutting in the widthwise direction can be conducted easily and rapidly.

Furthermore, preferably, the second step includes a step of conducting the setting such that each of the injected flows of the cutting gas is blown against both the trailing end of the preceding hot material and the leading end of the succeeding hot material to form corresponding cut-outs in both the trailing and leading ends. In this case, the second step may include a step of positioning one of the preceding and succeeding materials such that an end surface of corresponding one of the trailing and leading ends extends across the injected flows of the cutting gas and, then moving the other of the preceding and succeeding hot materials toward the end surface of the one end until and end surface of the other of the trailing and leading ends is abutted against the end surface of the one end. Moreover, the positioning of the end surface of the one end may be conducted such that the end surface of the one end extends substantially across centers of the respective injected flows of cutting gas.

Further, in the above-described joining method, the first step may include a step of arranging a plurality of melt-cut torches for forming their respective injected flows of the cutting gas in at least one row extending in a widthwise direction of the hot materials; the second step may include a step of conducting the setting such that a gap is defined between the trailing end of the preceding hot material and the leading end of the succeeding hot material while allowing each of the injected flows of cutting gas to be blown against both the trailing and leading ends; and the third step may include a step of conducting the melt-cutting on both the trailing end of the preceding hot material and the leading end of the succeeding hot material by the plurality of melt-cut torches.

In connection with the above, each of the injected gas flows from the respective melt-cut torches may be circular in cross-sectional configuration, may be elliptical in cross-sectional configuration elongated in the moving direction, or may be a slit-like cross-sectional configuration. Furthermore, two injected gas flows may be injected from a single torch. Moreover, if possible, injection may be conducted in an injection pattern in which a single slit is formed in the hot material over the entire length thereof in the widthwise direction. In this case, the entire length of the hot material can be melt-cut for a short period of time without movement of the melt-cut torches.

Further, the melt-cutting may be conducted continuously in the widthwise direction or may be conducted intermittently. In the case where the melt-cutting is conducted intermittently, the joining is also conducted intermittently. In this case, if the ends of the respective hot materials are joined to each other, sufficient strength can be ensured upon subsequent rolling, even if there are intermittent non-joined portions other than the joined portions.

Further, not only the cutting gas, but also fine iron powder may be injected through the melt-cut torches, whereby cutting performance increases and joining of stainless materials is made also possible.

Furthermore, in order to achieve the aforesaid first object, according to a second aspect of the invention, there is provided a joining apparatus for a plurality of hot materials to be rolled, in which a trailing end of a preceding one of the hot materials and a leading end of an adjacent succeeding one of the hot materials are joined to each other on a line of a continuous hot rolling system, wherein the joining apparatus comprises: melt-cutting means including a plurality of melt-cut torches arranged in at least one row in a widthwise direction of the hot materials for forming their respective injected flows of cutting gas; position setting means for relatively moving the preceding hot material and the succeeding hot material independently of each other in a direction of the line to set the trailing end of the preceding hot material and the leading end of the succeeding hot material in a predetermined positional relationship with respect to the row of the melt-cut torches; and forcing means for forcing the trailing end of the preceding hot material and the leading end of the succeeding hot material against each other to butt-join said trailing and leading ends to each other.

Moreover, in order to achieve the aforementioned first object, according to a third aspect of the invention, there is provided a continuous hot rolling system comprising at least a continuous casting machine, a plurality of rough rolling mills and a plurality of fine rolling mills, wherein the abovementioned joining apparatus is arranged between the continuous casting machine and the rough rolling mills. The joining apparatus may be arranged between the rough rolling mills and the fine rolling mills.

Further, in order to achieve the above-described second object, according to a fourth aspect of the invention, there is provided a method of joining a plurality of hot materials to be rolled to each other in a continuous hot rolling system, comprising: a first step of supplying a primary hot material to be rolled; a second step of reducing in thickness said primary hot material at a plurality of desired locations thereof to form a plurality of thickness-reduced portions; a third step of cutting the primary hot material at the thickness-reduced portions to form a plurality of secondary hot materials to be rolled; and a fourth step of joining the thickness-reduced portion of one of each pair of adjacent secondary hot materials and the thickness-reduced portion of the other secondary hot material to each other.

In the present invention, desired locations on the primary material are reduced in thickness to form the thickness-reduced portions, and cutting is made at the thickness-reduced portions, whereby time required for cutting is shortened, because the portions to be cut are reduced in thickness. The cut surface is brought to a joining surface for subsequent continuation. Since, however, cutting is made after thickness reduction, no influence of deformation of the end surface due to the thickness reduction appears, making it possible to produce a superior surface which is relatively planar. Thus, joining is made easy. Furthermore, since the area of each of the joining surfaces is reduced, time required for heating upon joining is considerably reduced, and a thrust force required for joining under pressure can considerably be reduced. Thus, joining is completed for a short period of time.

Moreover, the hot materials after having been joined to each other cannot be halted, because the materials are hot-rolled continuously. Since each of the materials before hot rolling has its considerable thickness, it is difficult to arrange a looper. Accordingly, as described previously, the possibility that the hot materials can be joined to each other for a short period of time enables rolling speed of the entire hot rolling system to be maintained at high speed, making it possible to conduct continuous hot rolling which is high in productivity.

Preferably, the aforesaid joining method further comprises: a fifth step of heating the plurality of secondary hot materials manufactured in the third step before the secondary hot materials are joined to each other in the fourth step. By doing so, reduction in temperature of each of the thickness-reduced portions, which occurs due to contact with the press tool upon thickness reduction, can be dissolved so that surfaces of mill rolls are prevented from being marred or damaged in the rolling step.

In the case where the above-described joining method is used to conduct continuous hot rolling, according to a fifth aspect of the invention, there is provided a continuous hot rolling method comprising: a step of joining respective ends of each pair of adjacent hot materials to each other by such joining method; and a step of hot-rolling the jointed hot materials.

Further, in order to achieve the aforesaid second object, according to a sixth aspect of the invention, there is provided a method of joining a plurality of hot materials to be rolled to each other in a continuous hot rolling system, comprising: a first step of successively supplying the hot materials; a second step of reducing in thickness an end of one of each pair of adjacent hot materials and an end of the other hot material with the ends abutted against each other to form thickness-reduced portions at the ends; and a third step of joining the thickness-reduced portion of one of each pair of adjacent hot materials and the thickness-reduced portions of the other hot material to each other.

The ends of respective adjacent two of the plurality of hot materials are reduced in thickness to form thickness-reduced portions under the condition that the ends are abutted against each other, whereby, since the end surfaces are restricted to each other, each of the end surfaces is made possible to maintain its flatness. Thus, joining is made easy similarly to cutting after thickness reduction.

In the aforementioned joining method, the first step may include a step of successively supplying a plurality of slabs cut into predetermined lengths as the hot materials. In this case, preferably, the aforesaid joining method further comprises a fourth step of heating the hot materials having their ends reduced in thickness in the second step before the hot materials are joined to each other in the third step. In the case where this joining method is used to conduct continuous hot rolling, according to a seventh aspect of the invention, there is provided a continuous hot rolling method comprising: a step of joining respective ends of each pair of adjacent slabs to each other by such joining method; a step of rough-rolling the joined slabs to form a bar; and an eleventh step of fine-rolling the rough-rolled bar.

Further, in the aforesaid joining method, the first step may include a step of rough-rolling a plurality of slabs cut into predetermined lengths to form a plurality of bars, and successively supplying the rough-rolled bars as the hot materials. In the case where this joining method is used to conduct continuous hot rolling, according to an eighth aspect of the invention, there is provided a continuous hot rolling method comprising: a step of joining respective ends of each pair of adjacent bars to each other by such joining method; and a step of fine-rolling the joined bars.

It is preferable that the second step includes a step of conducting the thickness reduction such that an amount of the thickness reduction $\Delta H$ is brought to a relationship of $\Delta H \leq \Delta H_1$ with respect to an amount of reduction $\Delta H_1$ of a first rolling mill which conducts the rolling.

Furthermore, in order to achieve the above-described second object, according to a ninth aspect of the invention, there is provided a continuous hot rolling system in which a plurality of hot materials to be rolled are successively joined to each other and the joined hot materials are hot-rolled, wherein the continuous hot rolling system comprises: a continuous casting machine for manufacturing a primary hot material to be rolled; press means arranged on an outlet side of the continuous casting machine for reducing in thickness said primary hot material at a plurality of desired locations thereof to form a plurality of thickness-reduced portions; cutting means for cutting the primary hot material at the thickness-reduced portions to form a plurality of secondary hot materials to be rolled; joining means for joining the thickness-reduced portion of one of each pair of adjacent secondary hot materials and the thickness-reduced portion of the other secondary hot material to each other; and rolling means for rolling the joined secondary hot materials.

Moreover, in order to achieve the aforesaid second object, according to a tenth aspect of the invention, there is provided a continuous hot rolling system in which a plurality of hot materials to be rolled are successively joined to each other and the joined hot materials are hot-rolled, wherein the continuous hot rolling system comprises: supply means for successively supplying the plurality of hot materials; press means arranged on an outlet side of the supply means for reducing in thickness an end of one of each pair of adjacent hot materials and an end of the other hot material with the ends abutted against each other to form thickness-reduced portions; joining means for joining the thickness-reduced portion of one of each pair of adjacent hot materials and the thickness-reduced portion of the other hot material to each other; and rolling means for rolling the joined hot materials.

In a continuous hot rolling system according to a tenth aspect of the invention, the supply means may comprise: a continuous casting machine for manufacturing a primary hot material to be rolled; and cutting means arranged on an outlet side of the continuous casting machine for cutting the primary hot material to form a plurality of secondary hot materials to be rolled. Further, the supply means may comprise heating means for receiving a plurality of cut slabs from the outside and heating the slabs to successively supply the heated slabs as the plurality of hot materials.

Furthermore, in the above-described continuous hot rolling system, the supply means may include at least one rough rolling mill for rough-rolling a plurality of slabs cut in predetermined lengths to form bars, the rough-rolled bars being successively supplied as the hot materials; and the rolling means may includes a plurality of fine rolling mills for fine-rolling the rough-rolled bars.

DETAILED DESCRIPTION OF THE PREFERRED EMBODIMENTS

Preferred embodiments of the invention will be described below with reference to the accompanying drawings.

An entire outline of a continuous hot rolling system for carrying out a joining method according to the invention will first be described with reference to FIGS. 1 and 2.

Figure 1:
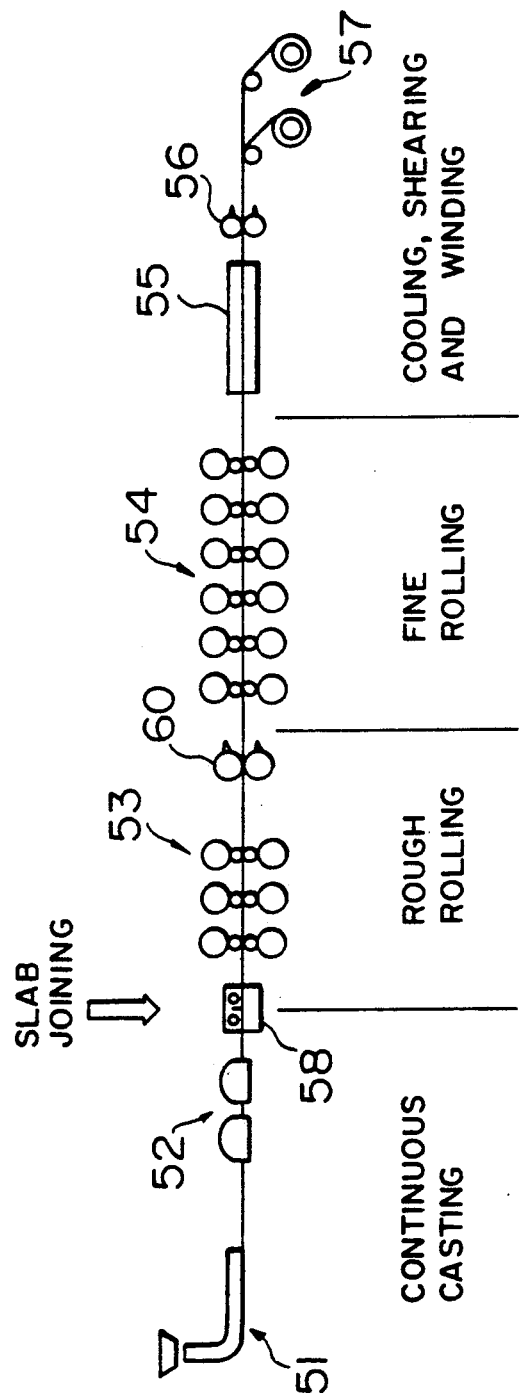
FIG. 1 is a view illustrating step divisions of a continuous hot rolling system according to an embodiment of the invention, and showing a location where a joining apparatus according to the embodiment of the invention is installed.
Figure 2:
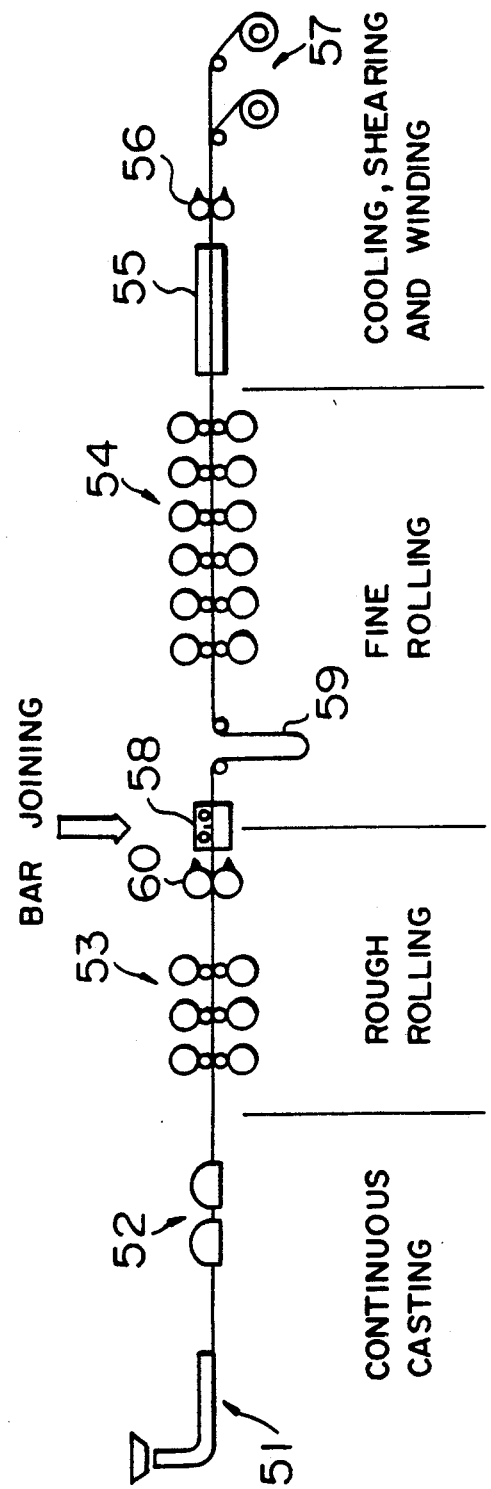
FIG. 2 is a view similar to FIG. 1, but showing another location where the joining apparatus is installed.

In FIGS. 1 and 2, the continuous hot rolling system, to which the invention is applied, comprises a continuous casting machine 51, a pair of heating furnaces 52, a plurality of rough rolling mills 53, a shear 60, a plurality of fine rolling mills 54, a cooling furnace 55, a shear 56 and a coiler 57 which are arranged in the mentioned order. The continuous casting machine 51 manufactures a slab which has its thickness of 120~300 mm and its width of 700~2000 mm. This slab is rolled by the rough rolling mills 53 into a bar whose thickness is 20~80 mm. The bar is rolled by the fine rolling mills 54 into a sheet product whose thickness is 1~12 mm. Generally, the shear 60 is provided for cutting crops of leading and trailing ends of the bar supplied to the fine rolling mills 54 to make its biting ability superior. Further, the shear 56 is provided for cutting the sheet product to be wound about the coiler 57 to form a product coil.

In connection with the above, in the specification, the slab manufactured by the continuous casting machine 51 and the bar after having been rolled by the rough rolling mills 53 will generally be referred to as "hot material to be rolled" or "hot material".

Joining of the hot materials according to the invention comprises two cases including a case, as shown in FIG. 1, where a joining apparatus 58 is arranged between the heating furnaces 52 and the rough rolling mills 53 so that each pair of adjacent slabs are joined to each other after a heating step and before a rough rolling step, and a case, as shown in FIG. 2, where the joining apparatus 58 is arranged between the rough rolling mills 53 and the fine rolling mills 54 so that each pair of adjacent bars are joined to each other after a rough rolling step and before a fine rolling step. The former slab joining is such that each pair of adjacent slabs are joined to each other while the joining apparatus 58 is moved in synchronism with movement of the slabs. The latter bar joining is such that, although each pair of adjacent bars may be joined to each other while the joining apparatus 58 is moved similarly to the case of the aforesaid slab joining, it is advantageous to provide a looper 59 in order to absorb unmatching in travel speed between a preceding material and a succeeding material because the hot materials are low in travel speed. In the case of the provision of the looper 59, not only it is of course that the travel speed can be made slow to join the materials to each other, but also it is possible to join the materials to each other while the hot materials are maintained halted or stationary. Furthermore, in the latter case, the joining apparatus 58 is arranged between the shear 60 and the fine rolling mills 54 such that leading and trailing ends of the adjacent respective bars are crop-cut and, subsequently, the trailing and leading ends are joined to each other by the joining apparatus 58.

An embodiment of the joining apparatus according to the invention will next be described with reference to FIGS. 3~6.

Figure 3:
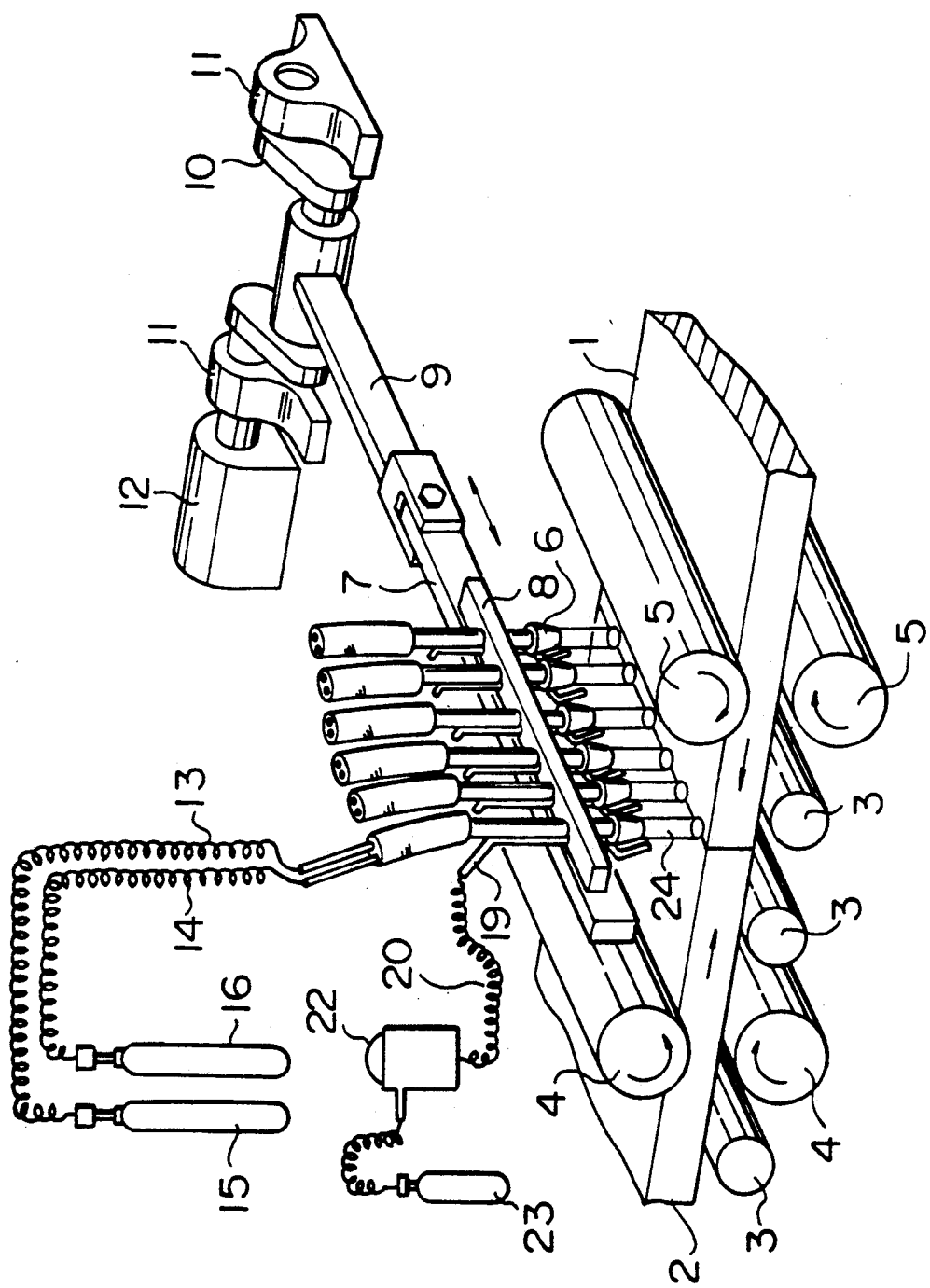
FIG. 3 is a perspective view of a principal portion of the joining apparatus according to an embodiment of the invention.

In FIG. 3, the reference numeral 1 denotes a preceding hot material to be rolled, and the reference numeral 2 designates a succeeding hot material to be rolled. The preceding material 1 and the succeeding material 2 are supported on a plurality of table rollers 3 and are transported thereon, and are halted at their respective desired positions. Two sets or pairs of pinch rollers 4 and 5 are arranged adjacent respectively to a leading end of the succeeding material 2 and a trailing end of the preceding material 1. The two pairs of rollers 5 and 4 have a position setting function for clamping therebetween the preceding material 1 and the succeeding material 2, respectively, to fix a relative position between the preceding and succeeding materials 1 and 2 and a forcing function for relatively moving the materials 1 and 2 toward each other to apply a thrust force to the trailing end surface of the preceding material 1 and the opposed leading end surface of the succeeding material 2.

A plurality of melt-cut torches 6 are arranged at a predetermined level above the materials 1 and 2 in spaced relation to each other at predetermined intervals in a widthwise direction of the materials 1 and 2. The melt-cut torches 6 are fixedly mounted to a frame 7 through a support 8. The frame 7 is connected to a crankshaft 10 through a connecting bar 9. The crankshaft 10 is rotatably supported by a pair of bearings 11 and 11 and is connected to a motor 12. When the motor 12 rotates, the frame 7 is reciprocated by the crankshaft 10 in the widthwise direction of the materials 1 and 2 and, correspondingly, the plurality of melt-cut torches 6 are also reciprocated.

Moreover, each of the melt-cut torches 6 is connected to an oxygen bomb 15 and an acetylene bomb 16 through respective hoses 13 and 14. By these bombs, oxygen 17 (refer to FIG. 4) and acetylene 18 (refer to FIG. 4) are gasified and are supplied to the melt-cut torch 6. Further, each melt-cut torch 6 has a powder supply pipe 19 for fine iron powder. The powder supply pipe 19 is connected, through a hose 20, to a powder supply container 22 receiving therein fine iron powder 21 (refer to FIG. 4), and to a bomb 23 for air or nitrogen. The air or nitrogen from the bomb 23 is gasified and passes through the powder supply container 22, so that the fine iron powder 21 is supplied to the melt-cut torch 6.

Figure 4:
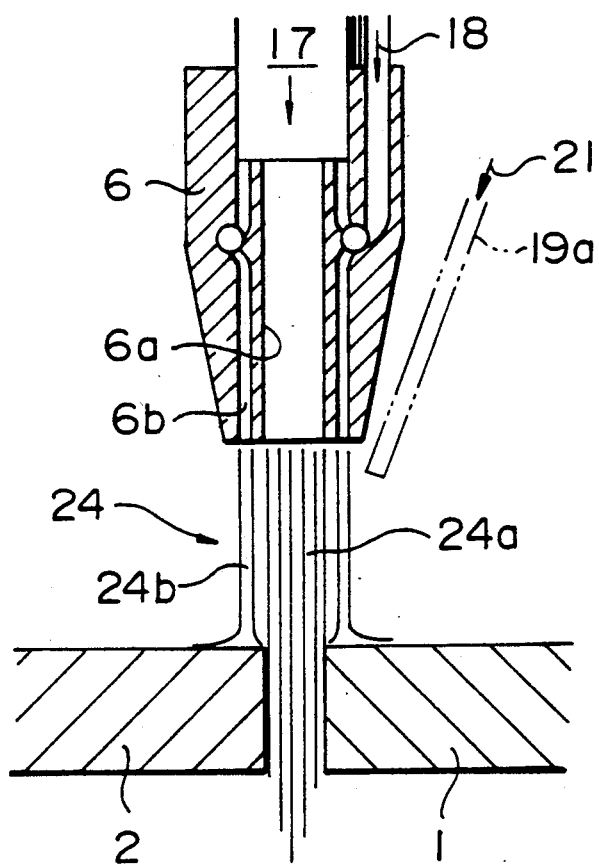
FIG. 4 is a cross-sectional view of a melt-cut torch.

FIG. 4 illustrates the details of each of the melt-cut torches 6 and a condition of an injected gas flow 24. The oxygen 17 is injected as cutting gas through a central bore 6a in the melt-cut torch 6 to form a main injection flow 24a. Furthermore, a plurality of bores 6b are arranged circumferentially of the central bore 6a. The oxygen 17 and the acetylene 18 are supplied into and through the bores 6b and are mixed with each other therein. The mixed oxygen and acetylene 17 and 18 are injected as an auxiliary injection flow 24b toward the periphery of the main injection flow 24a. Thus, a single injected gas flow 24 is formed as a whole. The auxiliary injection flow 24b serves to isolate the main injection flow 24a from the surrounding atmosphere until the main injection flow 24a reaches the ends of the adjacent respective materials 1 and 2, to maintain a function of the main injection flow 24a as cutting gas. Furthermore, if necessary, the iron powder 21 is injected to the injected gas flow 24 through a nozzle 19a connected to the powder supply pipe 19 to raise its cutting performance. By the injected gas flow 24, mother materials of the abutted ends of the respective hot materials 1 and 2 are brought to a high-temperature molten condition for a short period of time. By gas pressure of the main injection flow 24a, molten mother materials at end portions of the respective hot materials 1 and 2 substantially corresponding to a diameter of the main injection flow 24a are blasted so that new mother materials under the high-temperature molten condition are exposed. That is, end portions of the respective hot materials 1 and 2 corresponding to the main injection flow 24a are melt-cut. Simultaneously with the melt-cutting, oxidized scale on the surfaces of the opposite ends of the respective hot materials 1 and 2 is also removed.

Figure 5:
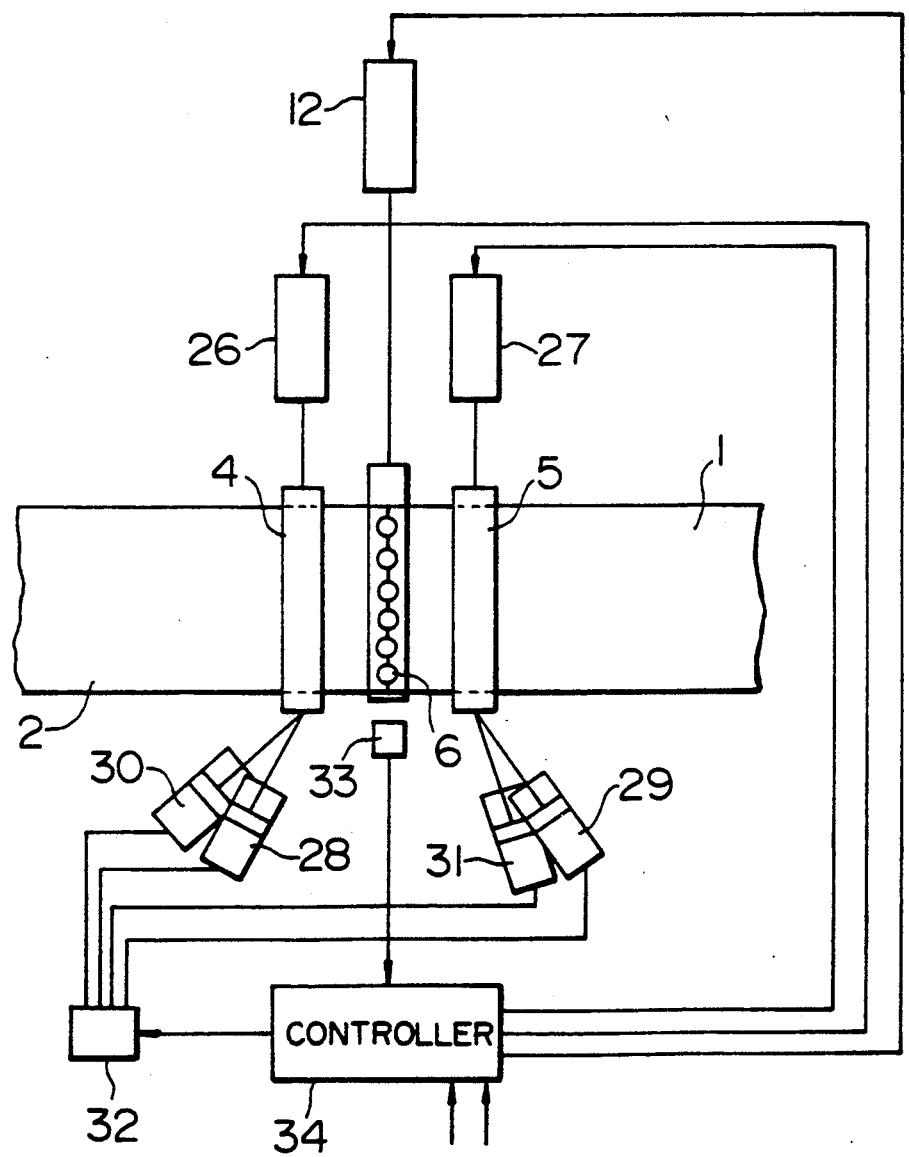
FIG. 5 is a schematic view of a drive and control system for the joining apparatus.

FIG. 5 illustrates an outline of a drive and control system of the aforesaid joining apparatus. The two pairs of pinch rollers 4 and 5 are connected to their respective individual motors 26 and 27, and are independently driven thereby, respectively. The pinch rollers 4 and 5 support the hot materials 1 and 2, respectively, only at joining thereof and, otherwise, are moved to their respective open positions. Accordingly, upper rollers of the respective pairs of pinch rollers 4 and 5 are supported by their respective cylinders 28 and 29 for vertical movement, while lower rollers of the respective pairs of pinch rollers 4 and 5 are supported by their respective cylinders 30 and 31 for vertical movement. The cylinders 28~31 are driven under control of their respective corresponding valves of a valve stand 32. Moreover, a gap sensor 33 is arranged, if necessary, between the pinch rollers 4 and 5 for detecting a gap g between the opposed end surfaces of the respective hot materials 1 and 2. A signal from the gap sensor 33 is sent to a controller 34. Inputted also to the controller 34 is a signal from a sensor (not shown) for detecting passage of the ends of the respective hot materials 1 and 2 on an upstream side as information for deciding operational timing of the pinch rollers 4 and 5. Command signals are sent from the controller 34 to the motors 12, 26 and 27 and to the valve stand 32.

The above description represents the arrangement of the joining apparatus in the case where the adjacent hot materials are joined to each other while being halted. In the case where the materials are joined to each other while being moved, the arrangement may be such that the aforementioned joining apparatus is mounted as a whole on a travel carriage and travels in synchronism with the materials. In this case, in order to avoid or prevent interference between the pinch rollers 4 and 5 and the table rollers 3, it is preferable that ones of the table rollers 3, which are located within the travel range of the joining apparatus, are movable vertically, and that, during joining, the movable table rollers are moved downwardly to their respective positions which do not interfere with the pinch rollers 4 and 5.

An embodiment of a joining method using the above-described joining apparatus will next be described.

Figure 6:
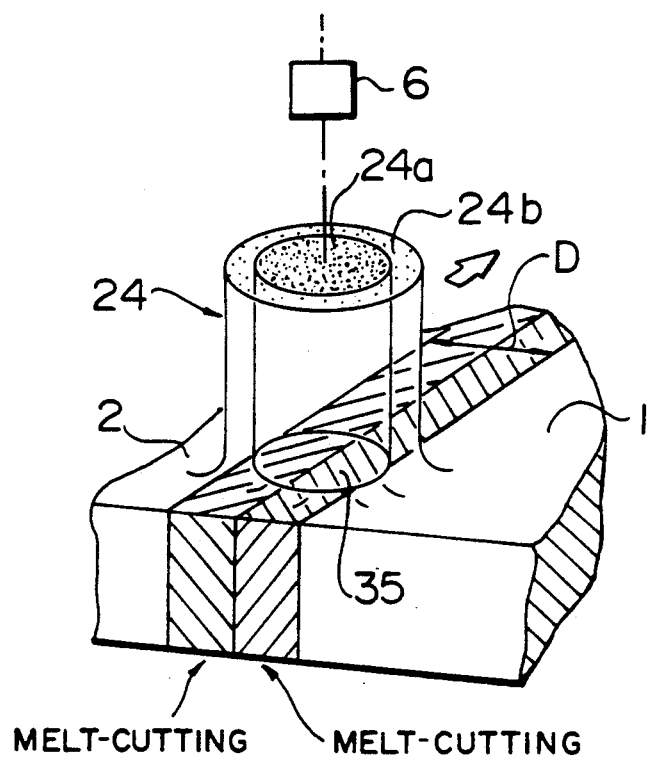
FIG. 6 is a view for explanation of a principle of a joining method according to the invention.

The principle of the joining method according to the invention will first be described with reference to FIG. 6. Under the condition that the injected gas flow 24 of the cutting gas is being formed by the melt-cut torch 6, the trailing end of the preceding hot material 1 and the leading end of the succeeding hot material 2 are moved to approach the injected gas flow 24, and then the relative position between the preceding material 1 and the succeeding material 2 is fixed and retained such that the opposed end surfaces of the respective preceding and succeeding materials 1 and 2 are abutted against each other substantially at the center of the diameter of the injected gas flow 24. By doing so, this is brought to such a condition that the injected gas flow 24 from the melt-cut torch 6 is blown against a portion whose width is substantially ½ of the diameter of the injected gas flow 24, from each of the end surfaces. As described previously, the portions of the respective materials 1 and 2, corresponding to the main injection flow 24a of the injected gas flow 24 are melted and removed. That is, assuming that the diameter of the main injection flow 24a is D, a cut-out 35 is formed at each end, whose width is substantially D/2 from the end surface. Then, the injected gas flow 24 from the melt-cut torch 6 is moved in the widthwise direction of the materials as indicated by an arrow, whereby the portion, whose width is approximately D/2 from the end surface of each hot material, is melt-cut with the cut-out 35 serving as a starting point and, subsequently, a joining surface of each hot material is formed which is under a molten condition equal to or above approximately 1400° C. Thus, even if the end surfaces of the respective hot materials 1 and 2 have irregularities in configuration due to shearing by a drum-type shear at a previous step, the irregular configuration is reshaped or reformed, making it possible to produce an end-surface configuration having high evenness or flatness. Furthermore, by this reshaping, the oxidized scale on the end surfaces of the respective hot materials is also removed, making it possible to produce clean joining surfaces. Accordingly, by forcing the hot materials 1 and 2 against each other, the materials are jointed to each other with a small thrust force homogeneously and highly accurately. Thus, there is produced joining of high strength.

As described previously, both the end surfaces of the hot materials are positioned such that the end surfaces are abutted against each other and extend across the vicinity of the center of the diameter of the injected gas flow 24. However, the end surfaces may be set in position with respect to the injected gas flow 24 by a relationship other than the aforesaid positioning. For example, the end surfaces may be set in position such that both the end surfaces extend across a position adjacent to the circumference of the diameter of the injected gas flow 24. Alternatively, setting in position may be made such that both the end surfaces are not abutted against each other, but the gap g is defined between the end surfaces. Moreover, forcing of the ends of the respective hot materials against each other may be made after melt-cutting of the end surfaces, or may be made while melt-cutting the end surfaces. In the latter case, since the ends of the respective hot materials are forced against and joined to each other while melt-cutting the end surfaces, there are produced the following advantages. That is, regeneration of the scale on the melt-cut surfaces is minimized, making it possible to secure more clean joining surfaces and to more shorten the joining time.

Further, by arranging the plurality of melt-cut torches 6 as shown in FIG. 3, an amount of movement of the melt-cut torches, which melt-cut the entire length of the end surfaces of the respective hot materials, is shortened so that time of melt-cutting the entirety of the end surfaces is shortened. For this reason, reduction in temperature of the melt-cut surfaces after melt-cutting is made less so that the oxidized scale after melt-cutting is prevented from being regenerated, making it possible to melt-cut the joining surfaces at high accuracy. Thus, the joining is made more reliable.

A specific procedure of the embodiment of the joining method on the basis of the above principle will be described with reference to FIG. 7.

Figure 7A:
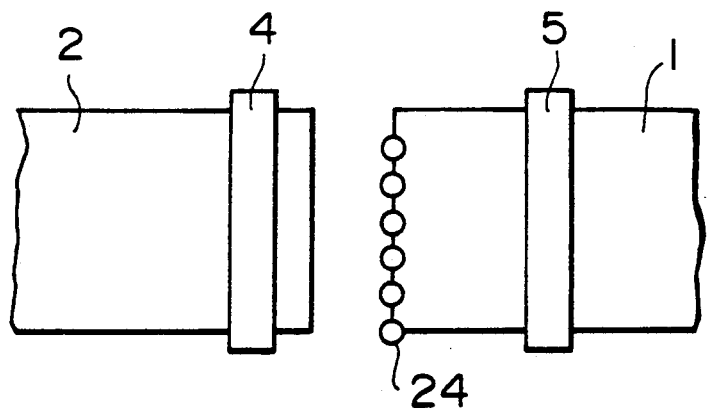
FIGS. 7(a) through 7(d) are views showing various steps of the joining method according to the invention.
Figure 7B:
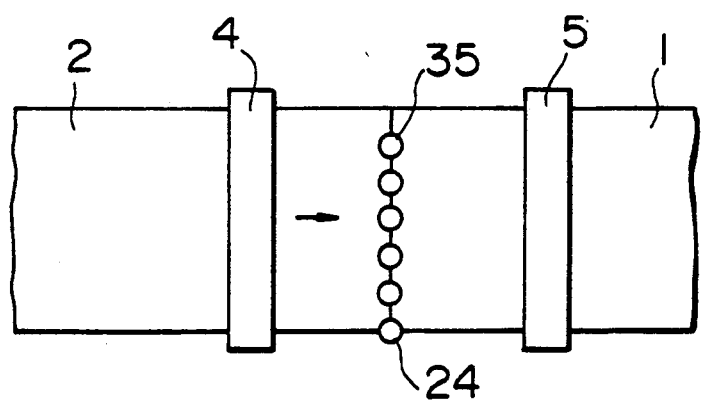

First, after the trailing end of the preceding hot material to be rolled 1 has passed through a location below the melt-cut torches 6 (refer to FIG. 5) arranged in plural, movement of the preceding material 1 is halted, and the cutting gasses are discharged respectively through the melt-cut torches 6 to form the injected gas flows 24. Then, under this condition, the cylinders 29 and 31 (refer to FIG. 5) are driven to hold the preceding hot material 1 by the pair of pinch rollers 5. Subsequently, the motor 27 (refer to FIG. 5) is driven to rotate the pair of pinch rollers 5, thereby moving the preceding material 1 in the reverse direction. Thus, the trailing end of the preceding material 1 approaches the injected gas flows 24 from the respective melt-cut torches 6. As shown in FIG. 7(a), driving of the motor 27 is halted at a position where the end surface of the preceding hot material 1 passes substantially through the center of the injected gas flows 24, and the preceding material 1 is fixedly held by the pair of pinch rollers 5. Subsequently, after the leading end of the succeeding hot material to be rolled 2 has passed through the pair of pinch rollers 4, the motor 26 and the cylinders 28 and 30 (refer to FIG. 5) are driven to cause the pair of pinch rollers 4 to move the succeeding hot material 2 toward the trailing end of the preceding hot material 1. Thus, the leading end of the succeeding material 2 is brought into abutting contact with the trailing end of the preceding material 1. By doing so, as shown in FIG. 7(b), melt-cut portions or the cut-outs 35 due to the injected gas flows 24 from the respective melt-cut torches 6 are formed at the end surfaces of both the respective hot materials 1 and 2. As described previously, each of the cut-outs 35 substantially corresponds to the diameter D of a corresponding one of the main injection flows 24a, and the injected gas flows 24 pass respectively through the cut-outs 35 over the thickness of the material 1. By formation of the cut-outs 35, the subsequent injected gas flows 24 enable the end surfaces of the respective hot materials 1 and 2 to be melt-cut quickly and reliably with the cut-outs 35 serving as respective starting points.

Figure 7C:
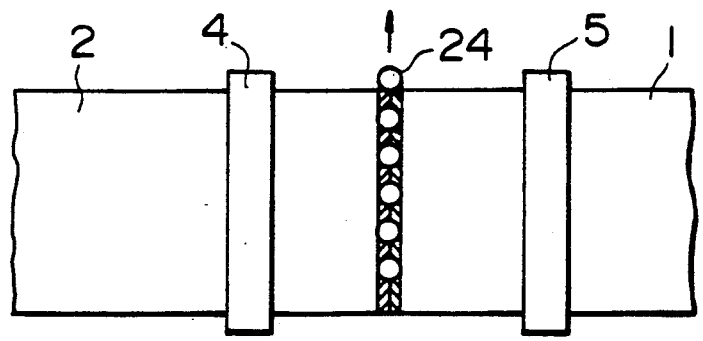
Figure 7D:
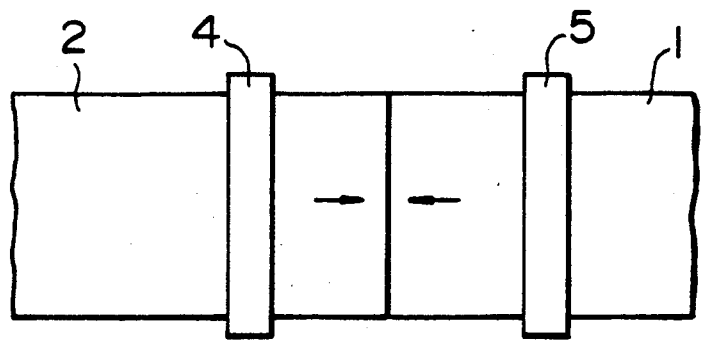

As the end surfaces of the respective hot materials 1 and 2 are brought to such a condition as to be in abutting contact with each other as mentioned previously, the motor 12 (refer to FIG. 3) is driven to move the frame 7 by which the melt-cut torches 6 arranged in plural are supported, thereby moving the injected gas flows 24 from the melt-cut torches 6, in the widthwise direction as illustrated in FIG. 7(c). By the movement of the injected gas flows 24, portions of the end surfaces of the respective materials 1 and 2, which are indicated by oblique lines in FIG. 7(c), are melt-cut over the entire length in the widthwise direction. Thus, the joining surfaces under a molten condition are formed. Then, the motor 26 is further driven and the motor 27 is again driven to apply the thrust force to the location between both the end surfaces by the pinch rollers 4 and 5. This causes the joining surfaces under a molten condition to be joined under pressure to each other, so that the ends of the respective materials 1 and 2 are immediately joined to each other as illustrated in FIG. 7(d). After retention for a predetermined period of time, rotation of the motors 26 and 27 is halted, and the cylinders 28~30 are driven to move the pinch rollers 4 and 5 to their respective open positions.

In connection with the above, in the case where the above-described joining is made while moving the hot materials 1 and 2, the joining apparatus should travel in synchronism with the movement of the hot materials 1 and 2.

According to the embodiment, both the trailing end surface of the preceding material 1 and the leading end surface of the succeeding material 2 are melt-cut by the injected gas flows 24 from the plurality of melt-cut torches 6. Accordingly, the end surfaces are brought as a whole to their respective conditions suitable for joining for a short period of time, making it possible to produce clean joining surfaces. There can be achieved homogeneous and highly accurate joining with a small thrust force, making it possible to produce joining having high strength. Further, at this time, if the fine iron powder 21 is mixed with the injected gas flows from the melt-cut torches 6, cutting performance increases, and joining of stainless materials is also made possible. In the embodiment, particularly, since the melt-cutting is made in the widthwise direction under a condition that the thrust force is applied, there can be produced the advantages that regeneration of the scale is minimized, and the joining strength is more improved, and further time can be shortened from start of the melt-cutting to the joining.

As shown in FIG. 2, in the case where the bars rolled by the rough rolled mills 53 are joined to each other, if a distance between the joining apparatus 58 and the fine rolled mills 54 is shortened, the joining operation is largely restricted by time. For this reason, it is desirable that the joining operation starting from positioning of the preceding hot material 1 and ending by releasing clampings of the pinch rollers after forcing the preceding and succeeding hot materials 1 and 2 by means of the pairs of pinch rollers 4 and 5 is carried into practice for a short period of time such as, for example, preferably equal to or less than 20 seconds, more preferably equal to or less than 15 seconds. According to experiments conducted by the inventors of the present application, it has been confirmed that the joining method according to the embodiment can bring the joining operation to time equal to or less than 20 seconds.

In connection with the above, in the aforesaid embodiment, the preceding hot material 1 is first positioned with respect to the injected gas flows 24 and, subsequently, the succeeding hot material 2 is moved toward the preceding material 1 and is positioned with respect thereto. However, the succeeding hot material 2 may first be positioned. Furthermore, in the above-described embodiment, the preceding hot material 1 is so returned as to be positioned with respect to the injected gas flows 24. If, however, the arrangement is such that the melt-cut torches 6 can be moved also in the transporting direction of the hot materials, the arrangement may be such that the preceding material 1 is fixed, and the melt-cut torches 6 are moved toward the trailing end of the preceding material 1 so as to be positioned with respect thereto. Moreover, although the end surfaces of the respective hot materials 1 and 2 are so positioned as to extend across the center of the injected gas flows, both the end surfaces may be so positioned as to pass through positions shifted respectively from the centers of the respective injected gas flows.

Further, in the embodiment, after the end surfaces of the respective materials 1 and 2 have been abutted against each other, the melt-cut torches are initiated to be laterally moved to move the injected gas flows. However, the melt-cut torches may be initiated to be laterally moved at the time a gap between the end surfaces is brought to a predetermined distance, and the gap may be reduced in width while melt-cutting the end surfaces. Furthermore, in the embodiment, the thrust force is applied after completion of the melt-cutting. However, the thrust force may be applied while the end surfaces are being melt-cut. This makes it possible to further reduce the time until completion of the joining.

Another embodiment of the joining method according to the invention will be described with reference to FIG. 8. The present embodiment is such that melt-cutting is made with a gap left between the end surfaces.

Figure 8A:
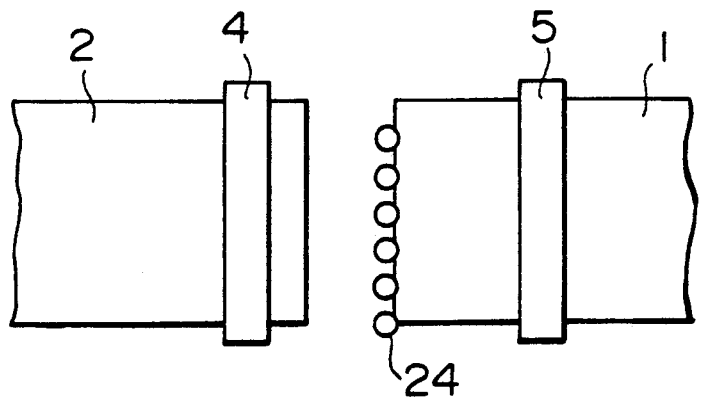
FIGS. 8(a) through 8(d) are views showing various steps of the joining method according to another embodiment of the invention.
Figure 8B:
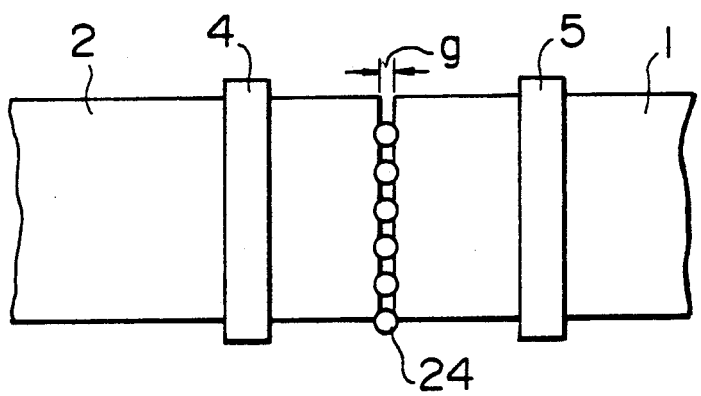

The cylinders 29 and 31 (refer to FIG. 5) are first driven to hold the preceding hot material 1 by the pair of pinch rollers 5. Subsequently, the motor 27 is driven to rotate the pair of pinch rollers 5, thereby causing the trailing end of the preceding material 1 to be moved toward the injected gas flows 24 from the respective melt-cut torches 6. As shown in FIG. 8(a), driving of the motor 27 is halted at a position where the trailing end surface of the preceding hot material 1 extends across parts of the injected gas flows 24, thereby fixedly holding the preceding material 1 by the pair of pinch rollers 5. Subsequently, after the leading end of the succeeding material 2 has passed through the pair of pinch rollers 4, the motor 26 and the cylinders 28 and 30 (refer to FIG. 5) are driven to cause the pair of pinch rollers 4 to move the succeeding material 2 toward the trailing end of the preceding material 1, thereby causing the leading end of the succeeding material 2 to approach the trailing end of the preceding material 1. A gap g between the trailing end surface of the preceding material 1 and the leading end surface of the succeeding material 2 is continuously monitored by the gap sensor 33 (refer to FIG. 5). As the gap g is brought to one as shown in FIG. 8(b), rotation of the motor 26 is halted to halt movement of the succeeding material 2, thereby fixedly holding both the materials 1 and 2 by the pinch rollers 4 and 5, respectively. Here, the gap g is brought to a relationship of g<D with respect to the diameter D of each of the main injection flows 24a. By doing so, a condition is brought to one under which the main injection flows 24a from the respective melt-cut torches 6 are blown against portions having predetermined widths of (D-g)/2 from the respective end surfaces. In this connection, preferably, the gap g is within a range of 0.2 D~0.8 D.

Figure 8C:
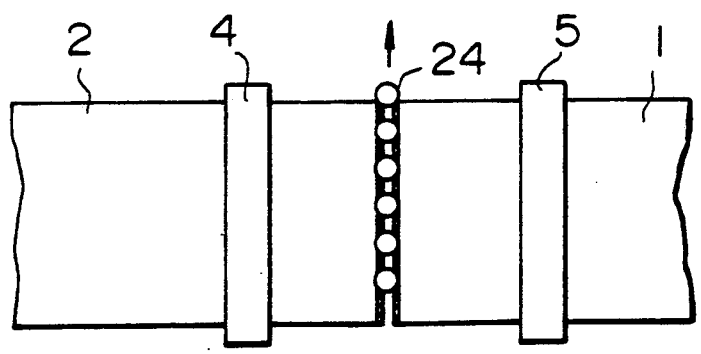

Subsequently, the motor 12 (refer to FIG. 3) is rotated to move the frame 7 by which the melt-cut torches 6 arranged in plural are supported, thereby moving the injected gas flows 24a from the respective melt-cut torches 6 in the widthwise direction along the gap g as shown in FIG. 8(c). By the movement of the injected gas flows 24, portions of the end surfaces of the respective hot materials 1 and 2, which are indicated by the oblique lines in FIG. 8(c), are melt-cut over the entire length in the widthwise direction, so that joining surfaces under a molten condition are formed. In this connection, the arrangement may be such that, at this time, after completion of first melt-cutting in one direction, the end surface of the preceding hot material 1 and the end surface of the succeeding hot material 2 are moved relatively toward each other to reset the gap g between both the end surfaces, the moving direction of the melt-cut torches is reversed to conduct another melt-cutting and, thereafter, this is repeated for the required number of times thereby doing a plurality of melt-cuttings. By doing so, the accuracy of the melt-cut surfaces can further be improved.

Figure 8D:
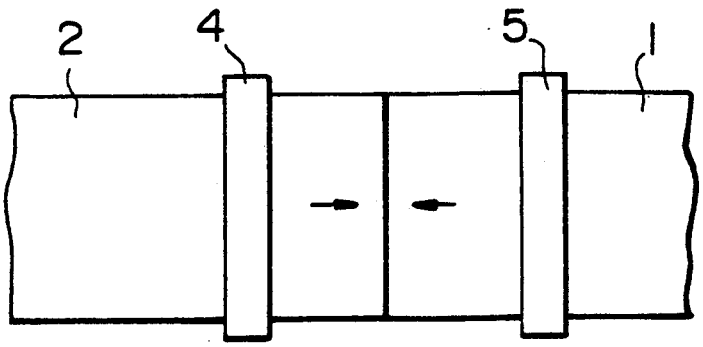

Simultaneously with completion of the melt-cutting, the motors 26 and 27 (refer to FIG. 5) are rotated to rotate the pairs of pinch rollers 4 and 5 which hold the hot materials 1 and 2, respectively. By doing so, the hot materials 1 and 2 are moved in such a direction as to approach each other. The joining surfaces under the molten condition are forced against each other as shown in FIG. 8(d), so that the ends of the respective hot materials 1 and 2 are joined to each other. After retention for a predetermined period of time, rotation of the motors 26 and 27 is halted, and the cylinders 28~31 are driven to move the pairs of pinch rollers 4 and 5 to their respective open positions.

According also to the present embodiment, the trailing end surface of the preceding hot material 1 and the leading end surface of the succeeding hot material 2 are melt-cut. Accordingly, there can be produced clean joining surfaces for a short period of time. Homogeneous and highly accurate joining can be achieved with a small thrust force. There can be produced joining having high strength.

Another embodiment of the joining apparatus according to the invention will be described with reference to FIG. 9. The present embodiment shows an arrangement in which the adjacent hot materials to be rolled are joined to each other while being moved.

Figure 9:
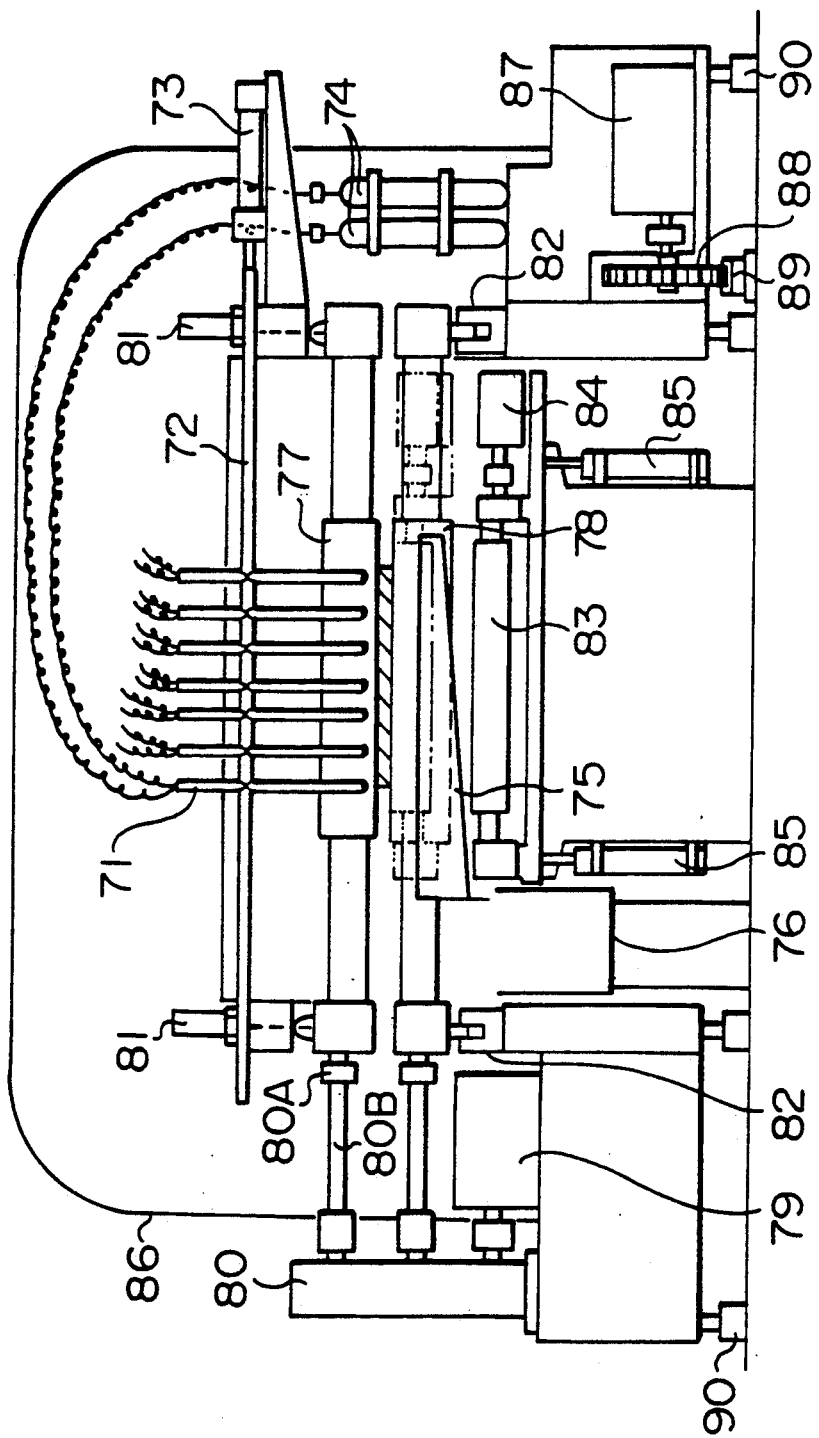
FIG. 9 is a front elevational view of a joining apparatus according to another embodiment of the invention.

In FIG. 9, a joining apparatus according to the present embodiment comprises, at its central region, a plurality of melt-cut torches 71 which are arranged at predetermined intervals in a direction perpendicular to the movement of the hot materials. A support table 72 for the melt-cut torches 71 is moved laterally by a cylinder 73. The melt-cut torches 71 are also connected to a pair of gas generation devices 74 which comprise an oxygen bomb and an acetylene bomb. A chute 75 for receiving melt-cut pieces of the hot materials is arranged below the melt-cut torches 71, and the melt-cut pieces are discharged into a bucket 76 through the chute 75. Further, a pair of inlet side pinch rollers 77 and 78 and a pair of outlet side pinch rollers (not shown) are arranged with the melt-cut torches 71 located therebetween. The pinch rollers are rotatively driven by individual motors 79 through drivers 80 and drive spindles 80B provided with universal joints 80A, respectively. The upper pinch roller 77 has a function of vertical movement and pressurization by a pair of cylinders 81, while the lower pinch roller 78 has a function of vertical movement and position retention by a pair of hydraulic jacks 82.

A table roller 83 is rotatively driven by a motor 84. An assembly structure including the table roller 83 and the motor 84 is movable vertically by a pair of cylinders 85 between a hot-material transporting level indicated by the two-dot-and-dash lines and a position indicated by solid lines where the joining apparatus does not interfere with the assembly structure at traveling of the joining apparatus. Furthermore, a framework 86 of the joining apparatus travels on a pair of rails 90 with a pinion 88 rotated by a motor 87 in mesh with a rack 89, under such a condition that the framework 86 straddles the table roller 83.

In connection with the above, in the aforementioned embodiment, each of the injected gas flows from the respective melt-cut torches is circular in cross-sectional configuration. However, the cross-sectional configuration of the injected gas flow is not limited to this one. The injected gas flow may be elliptical or in the form of a slit in cross-sectional configuration elongated in the moving direction. Furthermore, two or more injected gas flows may be injected from a single torch. Thus, various variations and modifications may be made to the invention.

Moreover, the cutting gas uses the oxygen in combination with the supporting gas of acetylene. However, the cutting gas may use the oxygen in combination with other gasses. Further, although the melt-cutting advantage is reduced, the cutting gas may utilize only the oxygen.

Furthermore, in the case where plasma injection flow is substituted for the oxygen, melt-cutting and joining of various metal materials, not only iron materials, are made possible.

Various embodiments relating to a method of controlling the melt-cut torches, according to the invention, will be described with reference to FIGS. 10 through 15. In the aforesaid embodiment, all of the melt-cut torches 6 are mounted on the support 8, and are movable together. Moreover, in the aforementioned embodiment, by the movement of the melt-cut torches 6, the entire surfaces of the ends of the respective hot materials to be rolled are continuously melt-cut in the widthwise direction. However, it is unnecessary that all of the melt-cut torches are movable, and melt-cutting of the ends of the respective hot materials may be made intermittently in the widthwise direction.

Figure 10:
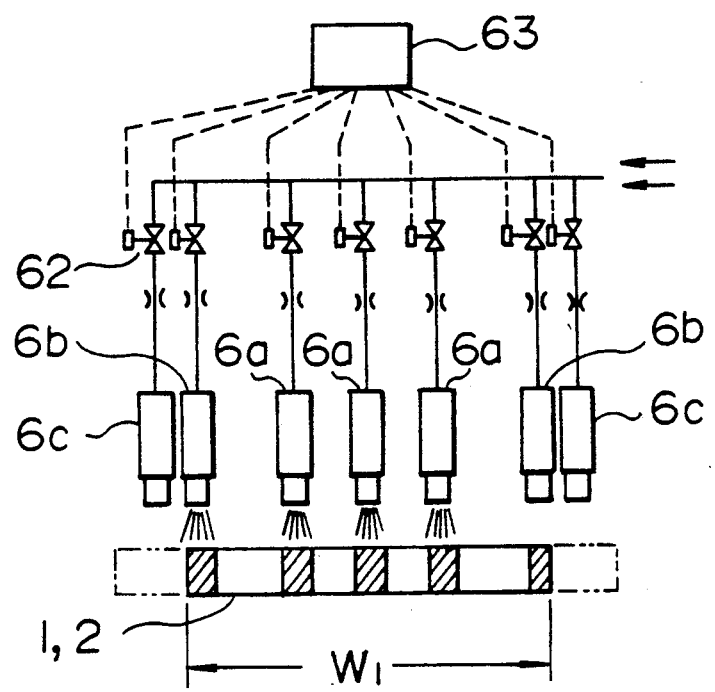
FIGS. 10 through 15 are views showing various embodiments of a method of controlling a plurality of melt-cut torches.

FIG. 10 shows an embodiment in which three melt-cut torches 6a at a central region are set fixedly in the widthwise direction in accordance with a minimum width of hot materials to be rolled, and two melt-cut torches 6b and 6c at each end region are movable in the widthwise direction in accordance with dimension or size of the widths of the hot materials to be rolled.

In the case where the width of the hot material is relatively wide as being $W_1$, the following is done as shown in FIG. 10. That is, since the width $W_1$ is beforehand known, the melt-cut torches 6b at both the ends are beforehand moved respectively to edges of the hot material. Regarding the outermost melt-cut torches 6c, stop valves 62 are closed by a signal from a controller 63. By doing so, melt-cutting can be done in accordance with the width of the hot material. Further, only locations corresponding respectively to the melt-cut torches are melt-cut and joined intermittently in the widthwise direction.

Figure 11:
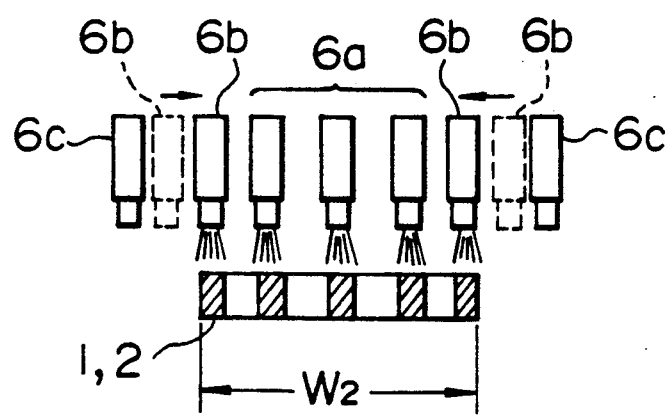

Furthermore, as shown in FIG. 11, in the case where the width is narrowed as being $W_2$, the melt-cut torches 6b are moved so as to be located at both ends of the width $W_2$, respectively. By doing so, intermittent melt-cutting and joining can be done in accordance with the width of the hot material to be rolled similarly to the above.

Furthermore, a case where the melt-cut torches 6 are slightly moved during melting in the intermittent joining in the widthwise direction will be described with reference to same widths and different widths, on the basis of FIGS. 12 through 15.

Figure 12:
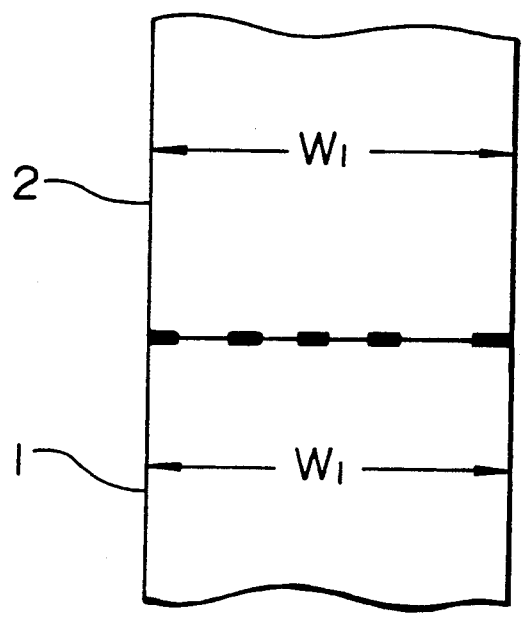
Figure 13:
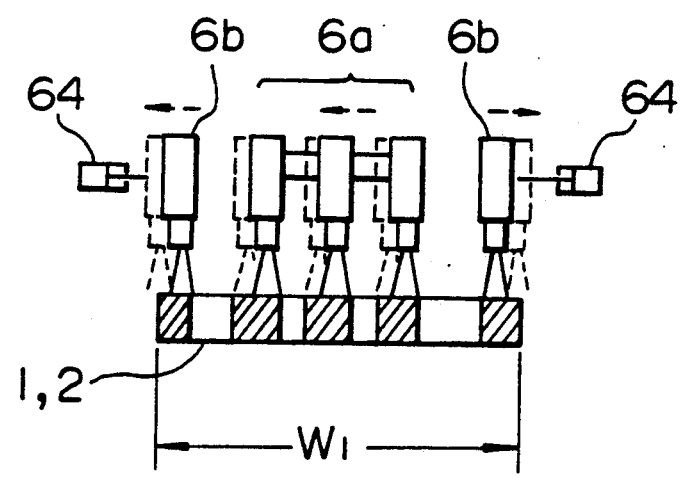

As shown in FIGS. 12 and 13, in the case where the preceding hot material 1 and the succeeding hot material 2 have the same dimension or size $W_1$ in width, the melt-cut torches 6a at the central region are moved together in the widthwise direction. On the other hand, the melt-cut torches 6b at both the ends initiate injection of the cutting gas from locations inside from both edges of the material, and are moved outwardly in the widthwise direction by their respective actuators 64, to melt the mother material. This is due to the following reason. That is, in the case where melting initiation of the mother material is compared between the edge portions and the central portion of the hot material, melting initiation at the edge portions is faster than that at the central portion. Thus, since the melt-cut torches 6b are controlled in movement identically with the melt-cut torches 6a in the central region, the above-described control is made.

Figure 14:
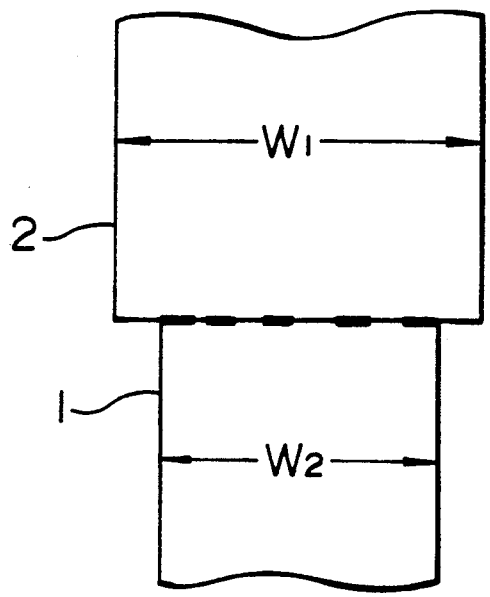
Figure 15:
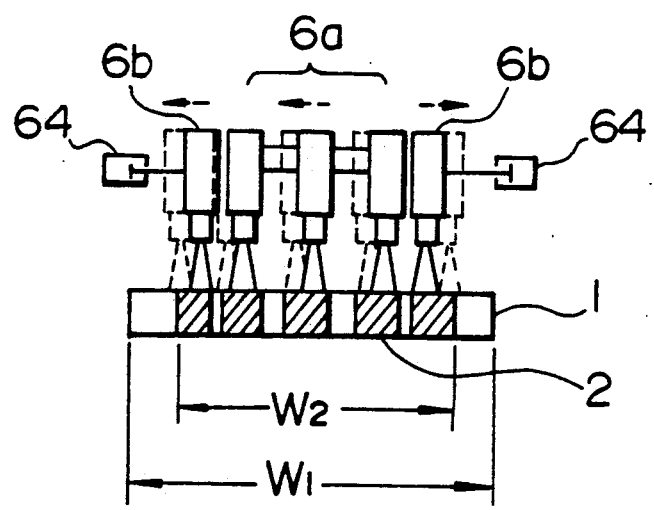

Furthermore, as shown in FIGS. 14 and 15, in order that mother materials different in width from each other having their widths $W_1$ and $W_2$ are joined to each other, setting and melt-cutting are made similarly to the aforesaid mother materials identical in width with each other, with the narrow width $W_2$ serving as a standard, whereby it is made possible to perform intermittent joining.

An embodiment according to the invention, in which the ends of the respective hot materials to be rolled are reduced in thickness and are joined to each other, will be described with reference to FIGS. 16 and 17.

Figure 16:
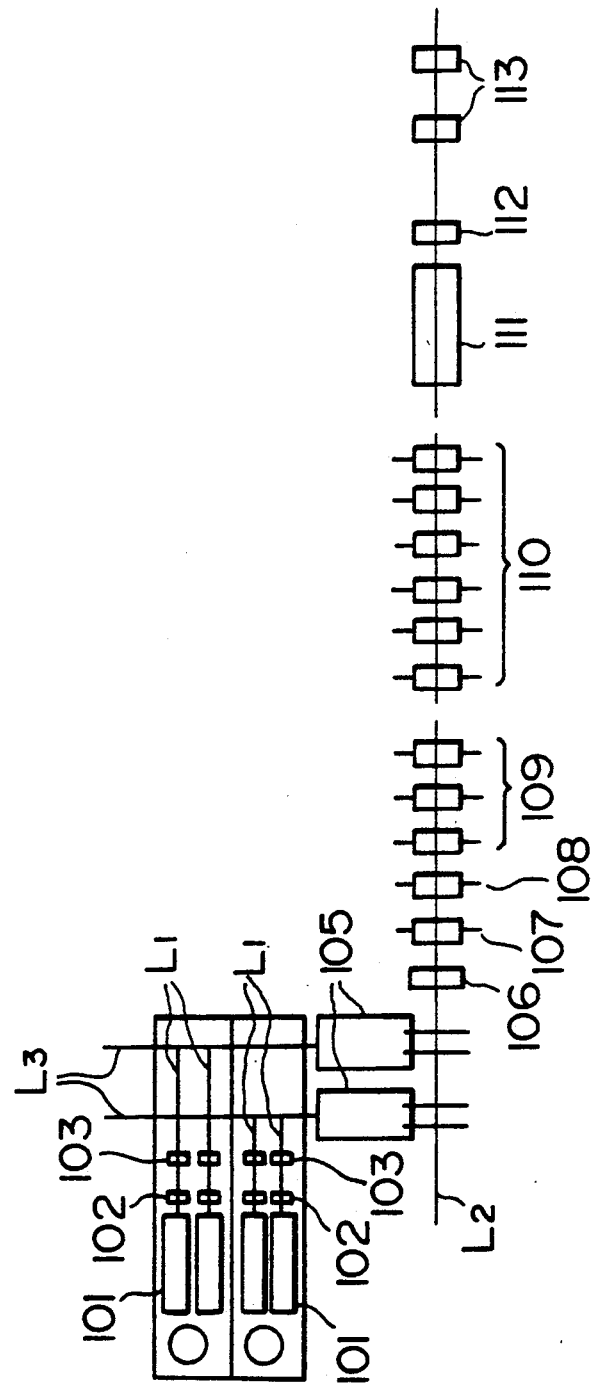
FIG. 16 is a schematic view of a continuous hot rolling system according to another embodiment of the invention.

FIG. 16 shows a continuous hot rolling system for carrying out the joining method according to the embodiment. The continuous hot rolling system comprises two pairs of continuous casting lines $L_1$ and a hot rolling line $L_2$.

Normally, each of hot materials manufactured by a plurality of continuous casting machines 101 is divided into pieces each having its length of about 10 m by a corresponding one of a plurality of gas dividers 103. In the present embodiment, each of the divided portions is reduced in thickness by a corresponding one of a plurality of press devices 102 before the gas division. An amount of thickness reduction is about 120 mm, for example, in the case where each of the hot materials manufactured by the continuous casting machines 101 has a thickness of 220 mm. Division is made at the thickness-reduced portions by the gas dividers 103 and, subsequently, the divided pieces are supplied to a pair of heating furnaces 105. By the thickness reduction, the respective divided portions at which gas division is practiced are reduced in thickness, so that time required for gas cutting is shortened. The gas divided surfaces are used as joining surfaces for continuation in a later step. However, there can be produced relatively superior surfaces which are gas-cut as they are. Thus, a joining operation in a later step can be made easy.

Further, the arrangement may be such that high-temperature materials manufactured by other continuous casting machines, having its ends reduced in thickness and cut into about 10 m is supplied to the pair of heating furnaces 105 respectively through a pair of lines $L_3$.

Figure 17:
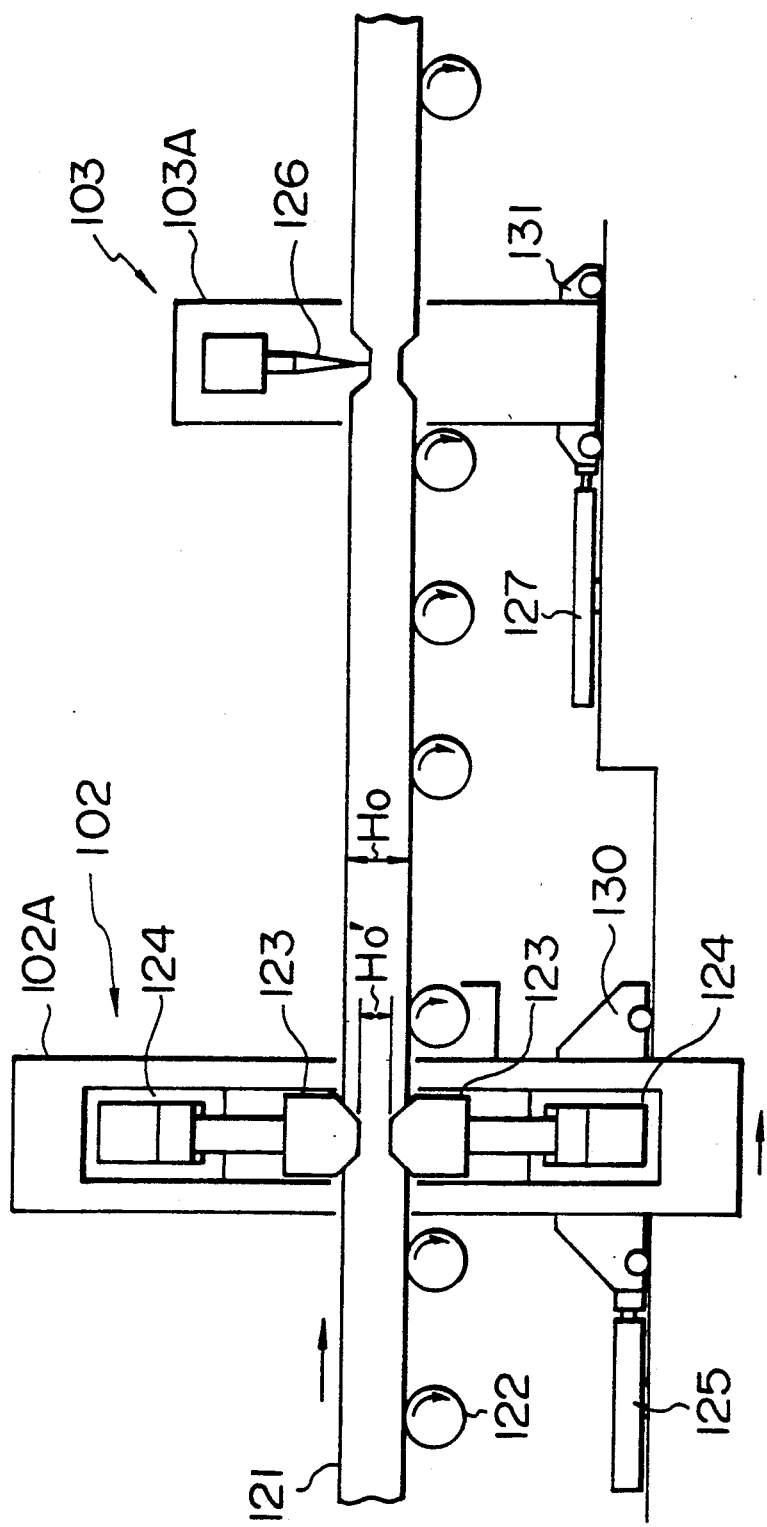
FIG. 17 is a schematic view of a press device and a gas divider illustrated in FIG. 16.

A construction of each of the press devices 102 for reducing in thickness the hot materials and a construction of each of the gas dividers 103 for gas-cutting the hot materials are shown in FIG. 17.

Since a hot material 121 to be rolled manufactured by each of the continuous casting machines 101 is manufactured substantially continuously, the aforesaid thickness-reduction operation and division operation must be practiced following traveling of the material 121.

That is to say, the press device 102 has a housing 102A which is mounted on a carriage 130 movable by a cylinder 125. A pair of upper and lower press tools 123 and a pair of hydraulic cylinders 124 for forcing the respective press tools 123 are arranged within the housing 102A. Each of the press tools 123 has a configuration including a parallel section extending substantially in parallel relation to a longitudinal direction of the hot materials and a pair of inclined section inclined with respect to the parallel section, for convenience of division or joining in a later step.

On the other hand, the gas divider 103 has a cutting torch 126 which is movable within a housing 103A in the widthwise direction of the hot material 121. The housing 103A is so constructed as to travel by a cylinder 127 and a movable carriage 131.

Referring back to FIG. 16, the hot materials 121 divided in this manner are fed to the heating furnaces 105 and are heated thereby uniformly and, subsequently, are supplied to the hot rolling line $L_2$.

The hot materials heated to 1200°~1300° C. by the heating furnaces 105 are jointed to each other by a joining apparatus 106 and are subjected to a predetermined reduction by subsequent rough rolling mills 107~109 and fine rolling mills 110 to form a hot steel web. The hot steel web is cooled by a cooling device 111 and, subsequently, is divided into adequate lengths by a shear 112. The divided pieces are wound about a pair of coilers 113.

Here, preferably, the aforesaid joining apparatus shown in FIG. 3 is used as the joining apparatus 106, and butt welding is made by the method shown in FIG. 7, FIG. 8 or the like.

Figure 18:
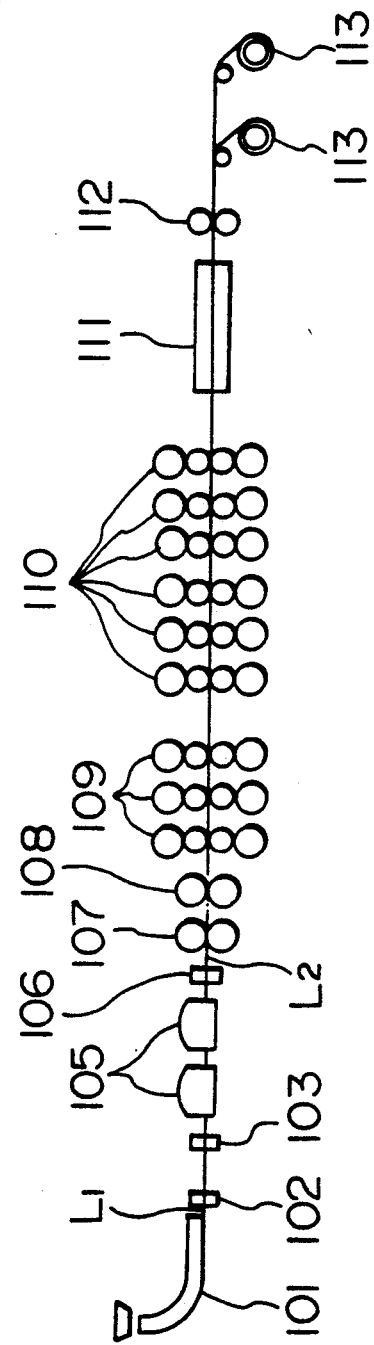
FIGS. 18 and 19 are schematic views of continuous hot rolling systems according respectively to still other embodiments of the invention.

FIG. 18 shows an embodiment which comprises a single continuous casting machine 101 in the continuous hot rolling system illustrated in FIG. 16. In the embodiment, the continuous casting line $L_1$ and the hot rolling line $L_2$ are arranged in coaxial relation to each other.

A hot material manufactured by the continuous casting machine 101 is reduced in thickness by the press device 102 at desired intervals (normally, about 10 m) as described previously. Division is made at the thickness-reduced portions by the gas divider 103 and, subsequently, the thickness-reducing portions are heated uniformly by the pair of heating furnaces 105. The hot material leaving the heating furnaces 105 is joined to the succeeding hot material at their respective adjacent thickness-reduced portions by the joining apparatus 106. The joined materials are supplied to the subsequent hot rolling step. Thus, continuation of the hot rolling can be realized.

Figure 19:
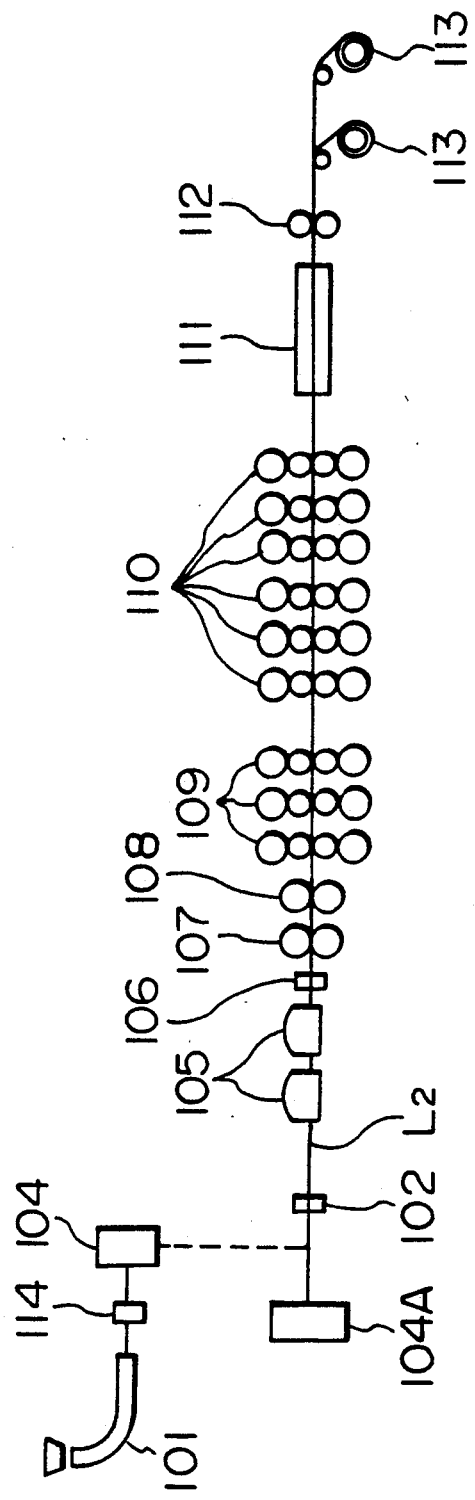

FIG. 19 shows a continuous hot rolling system comprising a step of retaining or storing, within the heating furnace 104, pieces into which a hot material manufactured by the continuous casting machine 101 is cut at desired lengths, and then suitably supplying the pieces to the hot rolling line $L_2$, and a step of storing, within the heating furnace 104A, pieces into which a hot material beforehand manufactured at another location is cut at desired lengths, and then suitably supplying the pieces to the hot rolling line $L_2$. In the heating furnaces 104 and 104A, temperature which does not interfere with the subsequent thickness reducing step of the hot materials, that is, temperature of about 600° C.~1000° C. should be kept.

The hot materials supplied to the hot rolling line $L_2$ have their respective ends reduced in thickness by the press device 102. Subsequently, the materials are uniformly heated by the pair of heating furnaces 105. Subsequently, the thickness reduced portions of the respective adjacent materials are joined to each other by the joining apparatus 106, and the joined materials proceed to the subsequent hot rolling step.

Figure 20:
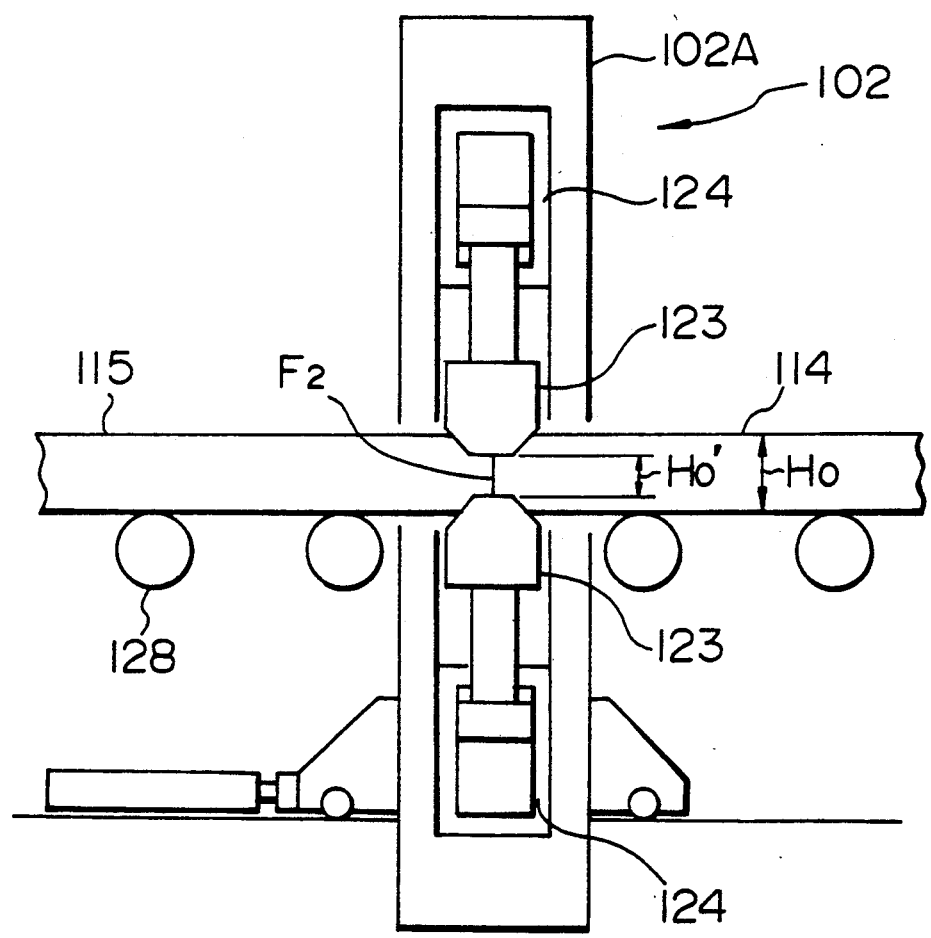
FIG. 20 is a view for explanation of a method of reducing in thickness a hot material to be rolled in the system illustrated in FIG. 19.

Here, a step of reducing in thickness by the press device 102 the ends of each of the adjacent hot materials which are beforehand cut at desired lengths, will be described with reference to FIG. 20.

A trailing end of a preceding hot material 114 to be rolled and a leading end of a succeeding hot material 115 to be rolled adjacent to the former material 114 are reduced in thickness by a pair of press tools 123 under such a condition that the trailing end of the preceding material 114 and the leading end of the succeeding material 115 are abutted against each other. That is, since the ends of the adjacent respective materials are reduced in thickness under such a condition that the end surfaces $F_2$ of the adjacent respective materials are abutted against each other, the end surfaces $F_2$ are restricted to each other. Accordingly, it is possible to secure evenness or flatness of each of the end surfaces. Thus, there can be produced such an advantage that subsequent joining between the end surfaces is made extremely easy.

In connection with the above, in the thickness reducing step of the hot materials by the press device 102, the device 102 is not required to travel, but may be stationary.

Figure 21:
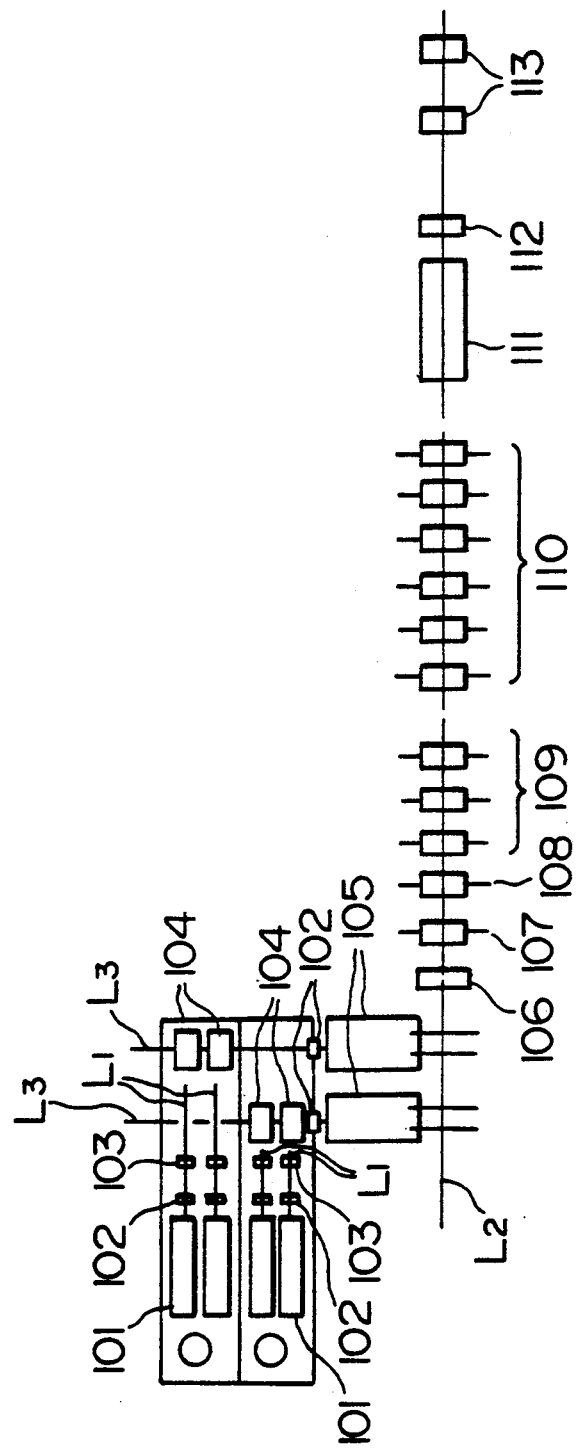
FIGS. 21 and 22 are schematic views of continuous hot rolling systems according respectively to still further embodiments of the invention.

FIG. 21 is a diagrammatical view of a continuous hot rolling system which comprises two pairs of continuous casting lines $L_1$, a pair of lines $L_3$ for awaiting hot materials beforehand manufactured, within the heating furnaces 104, and a hot rolling line $L_2$.

Hot materials manufactured respectively by the continuous casting machines 101 are reduced in thickness by the respective press devices 102 at desired intervals. Subsequently, division is made at the thickness reduced portions of each of the hot materials by a corresponding one of gas dividers 103. Subsequently, the divided hot materials are retained within a corresponding one of a pair of heating furnaces 105.

Alternatively, hot materials manufactured at respective lines and cut into pieces at desired lengths are stored in the heating furnaces 104. Ends of the hot materials are suitably reduced in thickness in the abutted manner as described previously, by the press devices 102. Subsequently, the hot materials are retained within the heating furnaces 105.

The thickness reduced portion of the hot material supplied to the hot rolling line $L_2$ from each of the heating furnaces 105 is joined to the thickness reduced portion of the adjacent material by the joining apparatus 106. The joined materials are subjected to a predetermined reduction by the subsequent rough rolling mills 107~109 and fine rolling mills 110 so as to be formed into a hot steel web. The hot steel web is cooled by the cooling device 111 and, subsequently, is divided into adequate lengths by the shear 112, and is wound by the pair of coilers 113.

Figure 22:
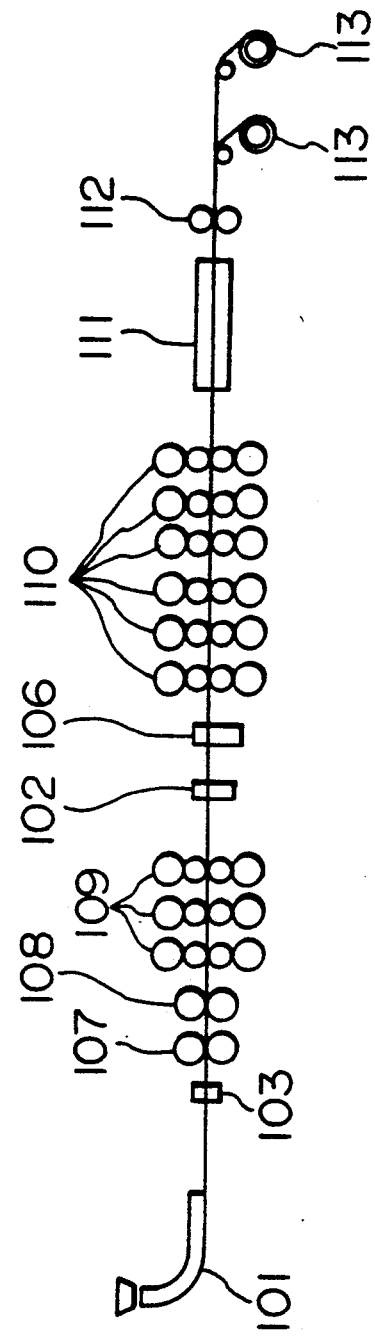

FIG. 22 shows a continuous hot rolling system in which the press device 102 and the joining apparatus 106 are arranged between the rough rolling mills 107~109 and the fine rolling mills 110.

A hot material manufactured by the continuous casting machine 101 is first rolled to a desired thickness by the rough rolling mills 107~109 so as to be formed into a bar. Subsequently, a trailing end of the bar and a leading end of a subsequent bar are reduced in thickness by the press device 102 in the abutting manner. Subsequently, the trailing end of the preceding bar and the leading end of the succeeding bar are joined to each other by the joining apparatus 106. Subsequently, the preceding and succeeding bars are subjected to a predetermined reduction by the fine rolling mills 110 so as to be formed into a hot steel web. In this case, it is preferable that, as the press device 102 and the joining apparatus 106, ones of traveling type are used which are movable together with the bar, and that, in order to reduce an amount of traveling of each of the press device 102 and the joining apparatus 106, a looper is arranged between the joining apparatus 106 and the fine rolling mills 110.

The effect and advantage of the pressing and the reduction in thickness due to the press device 102 are described previously. Accordingly, a principle of removing the thickness-reduced portions by reduction by the rolling mills will be described.

Figure 23:
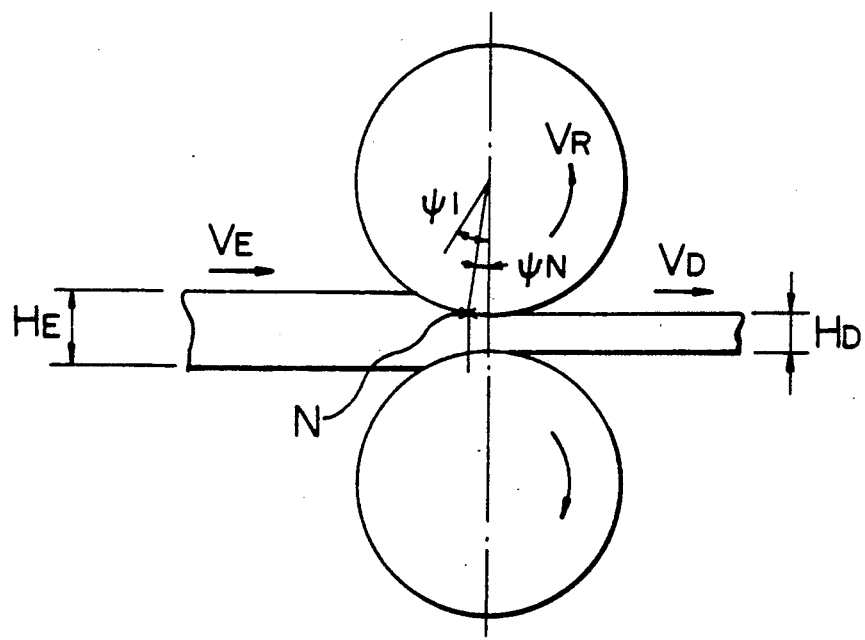
FIG. 23 is a view for explanation of a speed condition of a hot material to be rolled upon rolling.

FIG. 23 shows a normal rolling condition, in which a leaving portion of a hot material is faster in speed than an approaching portion of the material. Thus, the following equation holds:

$$H_E \cdot V_E = H_D \cdot V_D \quad (1)$$

Alternatively, $$V_E = (H_D/H_E) \cdot V_D \quad (2)$$

Here, $H_E$ is a thickness of a hot material before rolling; $H_D$ is a thickness of the hot material after rolling; $V_E$ is an approaching speed of the material; and $V_D$ is a leaving speed of the hot material.

Both the approaching speed $V_E$ and the leaving speed $V_D$ do not coincide with roll peripheral speed $V_R$. Generally, a relationship of $V_E < V_R < V_D$ holds. A location where the speed of the hot material and the roll peripheral speed coincide with each other is a point N within a roll bite. The point N is called a neutral point.

In the case where a draft $r$ ($=1-(H_D/H_E)$), a forward slip fs and a rearward slip fb are used, the following equation holds regarding the approaching speed $V_E$ and the leaving speed $V_D$:

$$V_E = V_R(1-fb) \quad (3)$$

$$V_D = V_R(1-fs) \quad (4)$$

In hot rolling whose tension is small, the following equation holds approximately:

$$fs = 0.3r \quad (5)$$

$$fb = (0.7+0.3r) \cdot r \quad (6)$$

Here, as rolling of the joined portion is initiated, the draft changes. Accordingly, if an amount of change is $\Delta r$, the forward slip and the rearward slip change as follows, from the equations (5) and (6):

$$\Delta fs = 0.3 \Delta r \quad (7)$$

$$\Delta fb = (0.7+0.6r) \cdot \Delta r \quad (8)$$

Assume, for example, that $r=0.4$, and $\Delta r = -0.3$. Then, $\Delta fs = -0.09$, and $\Delta fb = -0.282$. If the roll peripheral speed $V_R$ is constant, the approaching speed increases 28.2%, while the leaving speed is conversely reduced 9%. Accordingly, it is impossible to change the roll peripheral speed to retain the approaching speed and the leaving speed to their respective values the same as those of the previous ones. That is, if the roll peripheral speed increases 9% in order to make the leaving speed constant, the approaching speed also increases 37.2%.

Thus, the hot material approaching the rolling mill is rapidly accelerated at its joining portion. Accordingly, if there is a portion between the hot materials, at which the thickness changes abruptly, such as the joining portion, the preceding rolling mill cannot but cope with the abrupt change in speed. Thus, normal running cannot be made.

Figure 24:
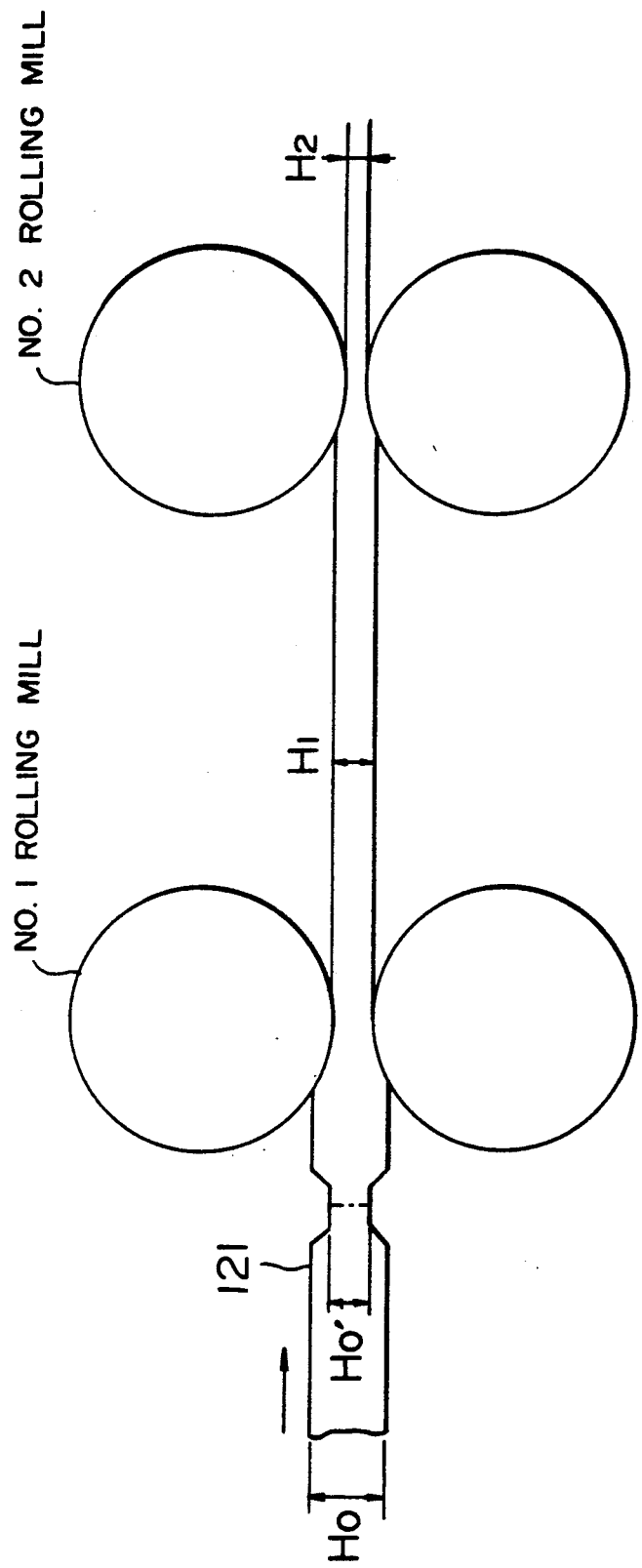
FIG. 24 is a view for explanation of a condition under which change in thickness of the material to be rolled is removed.

In view of the above, as shown in FIG. 24, after joining, reduction is made by the first rolling mill until there is no step on the joining portion, and the roll peripheral speed changes to retain the leaving speed. Thus, although the change in speed at rolling of the joining portion occurs only forwardly of the joining portion of the hot material, the change in speed does not interfere with subsequent rolling.

That is, assume that an amount through which the hot material is reduced in thickness by the press device 102 is $\Delta H$ ($=H_0-H_0'$), an amount of reduction at the first rolling mill is $\Delta H_1$, and the thickness of the hot material after rolling is $H_1$. Then, the hot material should be reduced in thickness by the following relationship:

$$\Delta H \leq \Delta H_1 (= H_0 - H_1)$$

The invention is constructed as described above. Thus, there are produced advantages to be described below.

(1) The adjacent ends of the respective hot materials are melt-cut together with oxidized scale. Accordingly, there are produced joining surfaces high in temperature and superior in surface accuracy, and there are produced joining high in accuracy and strength between the adjacent ends of the respective materials.

(2) Since melt-cutting is made by the plurality of melt-cut torches, melt-cutting time can be shortened, and regeneration of the oxidized scale after melt-cutting can be minimized. Thus, there is produced joining which is further high in strength.

(3) Moreover, the trailing end of the preceding hot material and the leading end of the succeeding hot material are melt-cut while being forced against each other, so that melt-cutting and forcing are made simultaneously. Accordingly, time from initiation of the melt-cutting to completion of the joining can be shortened, making it possible to further secure joining.

(4) Since melt-cutting is conducted while at least a part of the plurality of melt-cut torches are moved transversely, the melt-cutting time can further be shortened. Furthermore, at this time, since the melt-cut torches are moved transversely after cut-outs are formed in the ends of the respective hot materials by the melt-cutting, the melt-cutting in the widthwise direction can be made easily and quickly.

(5) The fine iron powder is used together with the cutting gas, whereby the melt-cutting performance can further be improved. Moreover, it is made possible to apply the melt-cutting to stainless hot materials.

(6) Since cutting is made at the thickness-reduced portions of the hot material, it is possible to shorten time required for cutting. Furthermore, since cutting is made after thickness reduction, no influence or affection of deformation of the end surface due to the thickness reduction appears. There can be produced a superior surface which is relatively plain, so that joining will be made easy. Moreover, since the joining surface is reduced in area, time required for heating upon joining can considerably be reduced, and a thrust force required for joining under pressure can also considerably be reduced. Thus, joining is completed for a short period of time.

(7) Since the hot material is heated after thickness reduction and before joining, reduction in temperature at the thickness reduced portions is dissolved. Thus, it is possible to prevent the surface of mill rolls from being scratched or marred at the rolling step.

(8) Since the ends of the respective adjacent ones of the plurality of hot materials are reduced in thickness under such a condition that the ends are abutted against each other, it is possible to secure flatness of the end surfaces. Thus, joining can be made easy similarly to cutting after thickness reduction.

(9) Since the hot materials can be joined to each other for a short period of time, the rolling speed of the entire hot rolling system can be maintained high, making it possible to produce a continuous hot rolling system high in productivity.

(10) Joining can be made from thin hot materials to thick hot materials, and can be made at any desirable locations in the hot rolling system. That is, any of slab joining and bar joining are possible. Thus, wide continuous rolling is made possible including continuous rolling of an already existing system.

(11) In a continuous hot rolling system in which slabs manufactured by continuous casting are joined to each other, and the joined materials are hot-rolled, there can be provided a joining method and an apparatus therefor in which the slabs can be jointed to each other for a short period of time.

What is claimed is:

1. A method of joining a plurality of hot materials to be rolled to each other, in which a trailing end of a preceding one of said hot materials and a leading end of an adjacent succeeding one of said hot materials are joined to each other on a line of a continuous hot rolling system, wherein the method comprises:
   (a) a first step of preparing at least one melt-cut torch for forming an injected flow of cutting gas;
   (b) a second step of setting said melt-cut torch in a predetermined positional relationship with respect to the trailing end of said preceding hot material and the leading end of said succeeding hot material;
   (c) a third step of blowing the injected flow of said cutting gas against a portion of at least one of the trailing end of said preceding hot material and the leading end of said succeeding hot material to melt-cut said portion, said portion extending from an end surface of the one end over a predetermined width in a longitudinal direction of said hot materials; and
   (d) a fourth step of forcing the trailing end of said preceding hot material and the leading end of said succeeding hot material, at least one of which has said melt-cut portion, against each other to butt-join said trailing and leading ends to each other.

2. A method of joining a plurality of hot materials to each other, according to claim 1, wherein: said third step includes a step of conducting melt-cutting on both the trailing end of said preceding hot material and the leading end of said succeeding hot material.

3. A method of joining a plurality of hot materials to each other, according to claim 1, wherein:
   said first step includes a step of arranging a plurality of melt-cut torches for forming their respective injected flows of said cutting gas in at least one row extending in a widthwise direction of said hot materials; and
   said third step includes a step of conducting said melt-cutting by said plurality of melt-cut torches.

4. A method of joining a plurality of hot materials to each other, according to claim 3, wherein: said third step includes a step of moving all of said plurality of melt-cut torches laterally in the widthwise direction of said hot materials to perform said melt-cutting.

5. A method of joining a plurality of hot materials to each other, according to claim 3, wherein: said third step includes a step of moving a part of said plurality of melt-cut torches laterally in the widthwise direction of said hot materials to perform said melt-cutting.

6. A method of joining a plurality of hot materials to each other, according to claim 5, wherein: said laterally moved part of said plurality of melt-cut torches includes torches located at both ends of the row of said melt-cut torches.

7. A method of joining a plurality of hot materials to each other, according to claim 3, wherein:
   said third step includes a step of conducting said melt-cutting continuously in the widthwise direction of said materials by said plurality of melt-cutting torches; and
   said fourth step includes, correspondingly to said continuous melt-cutting, a step of conducting said joining continuously in the widthwise direction of said hot materials.

8. A method of joining a plurality of hot materials to each other, according to claim 3, wherein:
   said third step includes a step of conducting said melt-cutting intermittently in the widthwise direction of said hot materials by said plurality of melt-cut torches; and
   said fourth step includes, correspondingly to said intermittent melt-cutting, a step of conducting said joining intermittently in the widthwise direction of said hot materials.

9. A method of joining a plurality of hot materials to each other, according to claim 3, wherein:
said first step includes a step of making movable at least a part of said plurality of melt-cut torches located at both ends of the row of said melt-cut torches, in a direction of said row; and
said second step includes a step of moving the melt-cut torches located at both the ends in accordance with a width of smaller one of said preceding hot material and said succeeding hot material to regulate a width of said row of said melt-cut torches.

10. A method of joining a plurality of hot materials to each other, according to claim 1, wherein:
said first step includes a step of arranging a plurality of melt-cut torches for forming their respective injected flows of said cutting gas in at least one row extending in a widthwise direction of said hot materials;
said second step includes a step of making said setting such that each of the injected flows of said cutting gas is at least partially blown against at least one of the trailing end of said preceding hot material and the leading end of said succeeding hot material to form a corresponding cut-out in the one end; and
said third step includes a step of conducting said melt-cutting by said plurality of melt-cut torches.

11. A method of joining a plurality of hot materials to each other, according to claim 10, wherein: said third step includes a step of moving at least a part of said plurality of melt-cut torches laterally in the widthwise direction of said hot materials to conduct said melt-cutting.

12. A method of joining a plurality of hot materials to each other, according to claim 10, wherein: said second step includes a step of conducting said setting such that each of said injected flows of said cutting gas is blown against both the trailing end of said preceding hot material and the leading end of said succeeding hot material to form corresponding cut-outs in both said trailing and leading ends.

13. A method of joining a plurality of hot materials to each other, according to claim 12, wherein: said second step includes a step of positioning one of said preceding and succeeding hot materials such that an end surface of a corresponding one of said trailing and leading ends extends across said injected flows of said cutting gas and, then moving the other of said preceding and succeeding hot materials toward said end surface of said one end until an end surface of the other of said trailing and leading ends is abutted against said end surface of said one end.

14. A method of joining a plurality of hot materials to each other, according to claim 13, wherein: said positioning of the end surface of said one end is conducted such that the end surface of said one end extends substantially across centers of the respective injected flows of said cutting gas.

15. A method of joining a plurality of hot materials to each other, according to claim 1, wherein:
said first step includes a step of arranging a plurality of melt-cut torches for forming their respective injected flows of said cutting gas in at least one row extending in a widthwise direction of said hot materials;
said second step includes a step of conducting said setting such that a gap is defined between the trailing end of said preceding hot material and the leading end of said succeeding hot material while allowing each of said injected flows of said cutting gas to be blown against both said trailing and leading ends; and
said third step includes a step of conducting said melt-cutting on both the trailing end of said preceding hot material and the leading end of said succeeding hot material by said plurality of melt-cut torches.

16. A method of joining a plurality of hot materials to each other, according to claim 15, wherein: said third step includes a step of moving at least a part of said plurality of melt-cut torches laterally in the widthwise direction of said hot materials to perform said melt-cutting.

17. A method of joining a plurality of hot materials to each other, according to claim 15, further comprising:
(e) a fifth step of moving the trailing end of said preceding hot material and the leading end of said succeeding hot material relatively toward each other, after completion of the melt-cutting in said third step and before the joining in said fourth step, to repeatedly conduct the setting in said second step and the melt-cutting in said third step.

18. A method of joining a plurality of hot materials to each other, according to claim 1, wherein: said third step includes a step of injecting fine iron powder from said melt-cut torch in addition to said cutting gas to perform said melt-cutting.

19. A joining apparatus for a plurality of hot materials to be rolled, in which a trailing end of a preceding one of said hot materials and a leading end of an adjacent succeeding one of said hot materials are joined to each other on a line of a continuous hot rolling system, wherein said joining apparatus comprises:
(a) melt-cutting means including a plurality of melt-cut torches arranged in at least one row in a widthwise direction of said hot materials for forming their respective injected flows of cutting gas;
(b) position setting means for relatively moving said preceding hot material and said succeeding hot material independently of each other in a direction of said line to set the trailing end of said preceding hot material and the leading end of said succeeding hot material in a predetermined positional relationship with respect to said row of said melt-cut torches; and
(c) forcing means for forcing the trailing end of said preceding hot material and the leading end of said succeeding hot material against each other to butt-join said trailing and leading ends to each other.

20. A joining apparatus for a plurality of hot materials, according to claim 19, wherein: said position setting means includes two sets of pinch rollers which serve also as said forcing means.

21. A joining apparatus for a plurality of hot materials, according to claim 19, further comprising moving means for moving at least a part of said plurality of melt-cut torches laterally in the widthwise direction of said hot materials.

22. A joining apparatus for a plurality of hot materials, according to claim 19, wherein: said melt-cutting means includes means for supplying said cutting gas and fine iron powder to said plurality of melt-cut torches.

23. A continuous hot rolling system including:
a continuous casting machine for producing cast hot material, a plurality of rough rolling mills disposed downstream of the casting machine for rolling the hot material, a plurality of fine rolling mills disposed downstream of the rough rolling mills for further rolling the hot material, and joining apparatus for joining respective leading and trailing ends of hot material pieces supplied by the casting machine, wherein said joining apparatus comprises:

(a) melt-cutting means including a plurality of melt-cut torches arranged in at least one row in a widthwise direction of said hot material pieces for forming their respective injected flows of cutting gas;

(b) position setting means for relatively moving a preceding hot material piece and a succeeding hot material piece independently of each other as they travel in the hot rolling system to place the trailing end of said preceding hot material piece and the leading end of said succeeding hot material in a predetermined positional relationship with respect to said row of said melt-cut torches; and (c) forcing means for forcing the trailing end of said preceding hot material piece and the leading end of said succeeding hot material piece against each other to butt-join said trailing and leading ends to each other.

24. A continuous hot rolling system according to claim 23, wherein the joining apparatus is disposed between said casting machine and said rough rolling mills.

25. A method of joining a plurality of hot materials to be rolled to each other in a continuous hot rolling system, comprising:

(a) a first step of supplying a primary hot material to be rolled;

(b) a second step of reducing in thickness said primary hot material at a plurality of desired locations thereof to form a plurality of thickness-reduced portions;

(c) a third step of cutting said primary hot material at said thickness-reduced portions to form a plurality of secondary hot materials to be rolled; and (d) a fourth step of joining the thickness-reduced portion of one of each pair of adjacent secondary hot materials and the thickness-reduced portion of the other secondary hot material to each other.

26. A method of joining a plurality of hot materials to each other, according to claim 25, wherein: said first step includes a step of successively supplying a plurality of continuously cast slabs as the primary hot materials.

27. A method of joining a plurality of hot materials to each other, according to claim 25, further comprising:

(e) a fifth step of heating said plurality of secondary hot materials manufactured in said third step before said secondary hot materials are joined to each other in said fourth step.

28. A method of joining a plurality of hot materials to each other, according to claim 25, wherein: said second step includes a step of conducting said thickness reduction while said primary hot material travels.

29. A method of joining a plurality of hot materials to each other, according to claim 25, wherein: said third step includes a step of conducting said cutting while said primary hot material travels.

30. A method of joining a plurality of hot materials to each other, according to claim 25, wherein said fourth step comprises:

(f) a sixth step of preparing at least one melt-cut torch for forming an injected flow of cutting gas;

(g) a seventh step of setting said melt-cut torch in a predetermined positional relationship with respect to a trailing end of a preceding one of said hot materials and a leading end of an adjacent succeeding one of said hot materials;

(h) an eighth step of blowing said injected flow of said cutting gas to a portion of at least one of the trailing end of said preceding hot material and the leading end of said succeeding hot material to melt-cut said portion, said portion extending from an end surface of the one end over a predetermined distance in a longitudinal direction of said hot materials; and (i) a ninth step of forcing the trailing end of said preceding hot material and the leading end of said succeeding hot material, at least one of which has said melt-cut portion, against each other to butt-join said trailing and leading ends to each other.

31. A continuous hot rolling method comprising:

(j) a tenth step of joining respective ends of each pair of adjacent hot materials to each other by the joining method defined in claim 25; and (k) an eleventh step of hot-rolling the jointed hot materials.

32. A continuous hot rolling method according to claim 31, wherein said eleventh step includes:

(l) a twelfth step of rough-rolling said joined hot materials to form a bar; and (m) a thirteenth step of fine-rolling the rough-rolled bar.

33. A continuous hot rolling method according to claim 31, wherein: said second step defined in claim 25 to which said tenth step refers includes a step of conducting the thickness reduction such that an amount of said thickness reduction $\Delta H$ is brought to a relationship of $\Delta H \leq \Delta H_1$ with respect to an amount of reduction of a first rolling mill which conducts the rolling in said eleventh step.

34. A method of joining a plurality of hot materials to be rolled to each other in a continuous hot rolling system, comprising:

(a) a first step of successively supplying said hot materials;

(b) a second step of reducing in thickness an end of one of each pair of adjacent hot materials and an end of the other hot material with the ends abutted against each other to form thickness-reduced portions at the ends; and (c) a third step of joining the thickness-reduced portion of one of each pair of adjacent hot materials and the thickness-reduced portion of the other hot material to each other.

35. A method of joining a plurality of hot materials to each other, according to claim 34, wherein: said first step includes a step of successively supplying as said hot materials a plurality of slabs cut into predetermined lengths.

36. A method of joining a plurality of hot materials to each other, according to claim 35, further comprising:

(d) a fourth step of heating the hot materials having their ends reduced in thickness in said second step before said hot materials are joined to each other in said third step.

37. A method of joining a plurality of hot materials to each other, according to claim 34, wherein: said first step includes a step of rough-rolling a plurality of slabs cut into predetermined lengths to form a plurality of bars, and successively supplying the rough-rolled bars as said hot materials.

38. A method of joining a plurality of hot materials to each other, according to claim 37, wherein: said thickness reduction in said second step and said joining in said third step are conducted while said bars travel.

39. A method of joining a plurality of hot materials to each other, according to claim 34, wherein said third step comprises:
   (e) a fifth step of preparing at least one melt-cut torch for forming an injected flow of cutting gas;
   (f) a sixth step of setting said melt-cut torch in a predetermined positional relationship with respect to a trailing end of a preceding one of said hot materials and a leading end of an adjacent succeeding one of said hot materials;
   (g) a seventh step of blowing said injected flow of said cutting gas against a portion of at least one of the trailing end of said preceding hot material and the leading end of said succeeding hot material to melt-cut said portion, said portion extending from an end surface of the one end over a predetermined distance in a longitudinal direction of said hot material; and
   (h) an eighth step of forcing the trailing end of said preceding hot material and the leading end of said succeeding hot material, at least one of which has said melt-cut portion, against each other to butt-join said trailing and leading ends to each other.

40. A continuous hot rolling method according to claim 39,
   wherein said first step includes a step of successively supplying as said hot materials a plurality of slabs cut into predetermined lengths,
   further comprising:
   rough-rolling the jointed slabs to form a bar; and
   fine-rolling the rough-rolled bar.

41. A continuous hot rolling method according to claim 40, wherein said first step includes a step of rough-rolling a plurality of slabs cut into predetermined lengths to form a plurality of bars, and successively supplying the rough-rolled bars as said hot materials,
   further comprising:
   joining respective ends of each pair of adjacent bars to each other; and
   fine-rolling the joined bars.

42. A continuous hot rolling method according to claim 40, wherein: said second step includes a step of conducting the thickness reduction such that an amount of said thickness reduction $\Delta$ is brought to a relationship of $\Delta H \leq \Delta H_1$ with respect to an amount of reduction $\Delta H_1$ of a first rolling mill which conducts the rolling in said tenth step or said thirteenth step.

43. A continuous hot rolling system in which a plurality of hot materials to be rolled are successively joined to each other and the joined hot materials are hot-rolled, wherein said continuous hot rolling system comprises:
   (a) a continuous casting machine for manufacturing a primary hot material to be rolled;
   (b) press means arranged on an outlet side of said continuous casting machine for reducing in thickness said primary hot material at a plurality of desired locations thereof to form a plurality of thickness-reduced portions;
   (c) cutting means for cutting said primary hot material at said thickness-reduced portions to form a plurality of secondary hot materials to be rolled;
   (d) joining means for joining the thickness-reduced portion of one of each pair of adjacent secondary hot materials and the thickness-reduced portion of the other secondary hot material to each other; and
   (e) rolling means for rolling the joined secondary hot materials.

44. A continuous hot rolling system according to claim 43, further comprising:
   (f) heating means arranged between said cutting means and said joining means for heating said plurality of secondary hot materials.

45. A continuous hot rolling system according to claim 43, wherein said rolling means comprises:
   (g) at least one rough rolling mill for rough-rolling said joined secondary hot materials to form a bar; and
   (h) a plurality of fine rolling mills for fine-rolling the rough-rolled bar.

46. A continuous hot rolling system according to claim 43, wherein said press means includes at least one press tool, and means for forcing said press tool in a thickness direction of said primary hot material.

47. A continuous hot rolling system according to claim 46, wherein said press tool has its configuration having a parallel section extending substantially in parallel relation to a longitudinal direction of said primary hot material and a pair of inclined sections inclined with respect to said parallel section, and wherein said press tool is disposed in a pair including upper and lower press tools.

48. A continuous hot rolling system according to claim 43, wherein said press means includes moving means movable in a traveling direction of said primary hot material.

49. A continuous hot rolling system according to claim 48, wherein said moving means includes a cylinder.

50. A continuous hot rolling system according to claim 43, wherein said cutting means includes moving means movable in a traveling direction of said primary hot material.

51. A continuous hot rolling system according to claim 50, wherein said moving means includes a cylinder.

52. A continuous hot rolling system according to claim 43, wherein said joining means comprises:
   (i) melt-cutting means including a plurality of melt-cut torches arranged in at least one row in a widthwise direction of said secondary hot materials for forming their respective injected flows of cutting gas;
   (j) position setting means for relatively moving a preceding one of said secondary hot materials and an adjacent succeeding one of said secondary hot materials independently of each other in a traveling direction of said secondary hot materials to set a trailing end of said preceding hot material and a leading end of said succeeding hot material in a predetermined positional relationship with respect to said row of melt-cut torches; and
   (k) forcing means for forcing the trailing end of said preceding secondary hot material and the leading end of said succeeding secondary hot material against each other to butt-join said trailing and leading ends to each other.

53. A continuous hot rolling system in which a plurality of hot materials to be rolled are successively joined to each other and the joined hot materials are hot-rolled, wherein said continuous hot rolling system comprises:
 (a) supply means for successively supplying said plurality of hot materials;
 (b) press means arranged on an outlet side of said supply means for reducing in thickness an end of one of each pair of adjacent hot materials and an end of the other hot material with the ends abutted against each other to form thickness-reduced portions at the ends;
 (c) joining means for joining the thickness-reduced portion of one of each pair of adjacent hot materials and the thickness-reduced portion of the other hot material to each other; and
 (d) rolling means for rolling the joined hot materials.

54. A continuous hot rolling system according to claim 53, wherein said supply means comprises:
 (e) a continuous casting machine for manufacturing a primary hot material to be rolled; and
 (f) cutting means arranged on an outlet side of said continuous casting machine for cutting said primary hot material to form a plurality of secondary hot materials to be rolled.

55. A continuous hot rolling system according to claim 54, wherein said supply means further comprises:
 (g) heating means arranged between said cutting means and said joining means for heating said plurality of secondary hot materials to successively supplying the heated secondary hot materials as said plurality of hot materials.

56. A continuous hot rolling system according to claim 53, wherein said supply means comprises:
 (h) heating means for receiving a plurality of cut slabs from the outside and heating said slabs to successively supply the heated slabs as said plurality of hot materials.

57. A continuous hot rolling system according to claim 53, wherein said supply means comprises:
 (i) a continuous casting machine for manufacturing a primary hot material to be rolled;
 (j) cutting means arranged on an outlet side of said continuous casting machine for cutting said primary hot materials to form a plurality of secondary hot materials to be rolled;
 (k) first heating means arranged between said cutting means and said joining means for heating said plurality of secondary hot materials to successively supply the heated secondary hot materials as said plurality of hot materials; and
 (l) second heating means for receiving a plurality of cut slabs from the outside and heating said slabs to successively supply the heated slabs as said plurality of hot materials.

58. A continuous hot rolling system according to claim 53, wherein
 (m) said supply means includes at least one rough rolling mill for rough-rolling a plurality of slabs cut in predetermined lengths to form bars, the rough-rolled bars being successively supplied as said hot materials; and
 (n) said rolling means includes a plurality of fine rolling mills for fine-rolling said rough-rolled bars.

59. A continuous hot rolling system according to claim 58, wherein said press means and said joining means have their respective moving means movable in the travel direction of said hot materials.

60. A continuous hot rolling system according to claim 53, wherein said press means includes at least one press tool and means for forcing said press tool in a thickness direction of said primary hot materials.

61. A continuous hot rolling system according to claim 60, wherein said press tool has its configuration having a parallel section extending substantially in parallel relation to a longitudinal direction of said primary hot materials and a pair of inclined sections inclined with respect to said parallel section, and wherein said press tool is disposed in a pair including upper and lower press tools.

62. A continuous hot rolling system according to claim 53, wherein said joining means comprises:
 (i) melt-cutting means including a plurality of melt-cut torches arranged in at least one row in a widthwise direction of said hot materials for forming their respective injected flows of cutting gas;
 (j) position setting means for relatively moving a preceding one of said hot materials and an adjacent succeeding one of said hot materials independently of each other in a traveling direction of said hot materials to set a trailing end of said preceding hot material and a leading end of said succeeding hot material in a predetermined positional relationship with respect to said row of said melt-cut torches; and
 (k) forcing means for forcing the trailing end of said preceding hot material and the leading end of said succeeding hot material against each other to butt-join said trailing and leading ends to each other.

63. A continuous hot rolling system according to claim 23, wherein the joining apparatus is disposed between said rough rolling mills and said fine rolling mills.

64. A continuous hot rolling system according to claim 24, wherein said position setting means includes two sets of pinch rollers which serve also as said forcing means.

65. A continuous hot rolling system according to claim 63, wherein said position setting means includes two sets of pinch rollers which serve also as said forcing means.

66. A continuous hot rolling system according to claim 24, further comprising moving means for moving at least a part of said plurality of melt-cut torches laterally in the widthwise direction of said hot material pieces.

67. A continuous hot rolling system according to claim 63, further comprising moving means for moving at least a part of said plurality of melt-cut torches laterally in the widthwise direction of said hot material pieces.

68. A continuous hot rolling system according to claim 24, wherein said melt-cutting means includes means for supplying said cutting gas and fine iron powder to said plurality of melt-cut torches.

69. A continuous hot rolling system according to claim 63, wherein said melt-cutting means includes means for supplying said cutting gas and fine iron powder to said plurality of melt-cut torches.

70. A continuous hot rolling method according to claim 41, wherein said second step includes a step of conducting the thickness reduction such that an amount of said thickness reduction $\Delta$ is brought to a relationship of $\Delta H \leq \Delta H_1$ with respect to an amount of reduction $\Delta H_1$ of a first rolling mill which conducts the rolling in said tenth step or said thirteenth step.

* * * * *